United States Patent
Gyeong et al.

(10) Patent No.: US 11,846,441 B2
(45) Date of Patent: Dec. 19, 2023

(54) AIR CONDITIONER

(71) Applicant: LG ELECTRONICS INC., Seoul (KR)

(72) Inventors: Giyeong Gyeong, Seoul (KR); Jungwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 606 days.

(21) Appl. No.: 16/978,178

(22) PCT Filed: Mar. 7, 2019

(86) PCT No.: PCT/KR2019/002673
§ 371 (c)(1),
(2) Date: Sep. 3, 2020

(87) PCT Pub. No.: WO2019/172687
PCT Pub. Date: Sep. 12, 2019

(65) Prior Publication Data
US 2020/0408433 A1 Dec. 31, 2020

(30) Foreign Application Priority Data
Mar. 7, 2018 (KR) .......... 10-2018-0026963

(51) Int. Cl.
*F24F 11/74* (2018.01)
*G05B 15/02* (2006.01)
(Continued)

(52) U.S. Cl.
CPC .............. *F24F 11/74* (2018.01); *F24F 1/005* (2019.02); *F24F 1/0011* (2013.01); *F24F 11/38* (2018.01); *G05B 15/02* (2013.01)

(58) Field of Classification Search
CPC .......... F24F 11/74; F24F 1/0011; F24F 1/005; F24F 11/38; F24F 2221/32; F24F 13/12;
(Continued)

(56) References Cited

U.S. PATENT DOCUMENTS

| 4,391,320 A | 7/1983 | Inoue et al. |
| 5,604,599 A | 2/1997 | Ono |

(Continued)

FOREIGN PATENT DOCUMENTS

| CN | 1158402 A | 9/1997 |
| CN | 1443991 A | 9/2003 |

(Continued)

*Primary Examiner* — Ramesh B Patel
(74) *Attorney, Agent, or Firm* — BRYAN CAVE LEIGHTON PAISNER LLP

(57) ABSTRACT

Disclosed is an air-conditioner including a front panel forming an appearance of a front portion, a circulator door disposed at the front panel and moving in an up-down direction so as to be opened and closed, a circulator module moving backward based on a product OFF command and moving forward based on a product ON command, and a controller controlling the circulator door to move in a downward direction so as to be opened and the circulator module to move forward based on the product ON command, whereby the circulator door and the circulator module may be efficiently controlled.

17 Claims, 19 Drawing Sheets

(51) Int. Cl.
*F24F 1/0011* (2019.01)
*F24F 1/005* (2019.01)
*F24F 11/38* (2018.01)

(58) Field of Classification Search
CPC ........ F24F 13/24; F24F 2120/10; F24F 11/79;
F24F 11/52; F24F 11/526; F24F 11/56;
F24F 11/64; F24F 11/89; F24F 13/20;
F24F 2120/12; F24F 13/10; F24F
2140/00; G05B 15/02
See application file for complete search history.

(56) References Cited

U.S. PATENT DOCUMENTS

| | | | |
|---|---|---|---|
| 5,807,170 A | 9/1998 | Lee | |
| 10,203,121 B2* | 2/2019 | Song | F24F 13/222 |
| 10,294,946 B2* | 5/2019 | Mun | F24F 1/0033 |
| 10,928,083 B2* | 2/2021 | Park | A61L 9/20 |
| 11,079,119 B2* | 8/2021 | Jeon | F24F 1/0033 |
| 11,175,052 B2* | 11/2021 | Ha | F24F 11/84 |
| 11,346,575 B2* | 5/2022 | Chun | F24F 13/24 |
| 11,401,949 B2* | 8/2022 | Fukumasu | F04D 19/002 |
| 11,541,342 B2* | 1/2023 | Choi | B01D 46/12 |
| 2004/0119428 A1 | 4/2004 | Abe et al. | |
| 2018/0209667 A1* | 7/2018 | Jeon | F24F 13/12 |
| 2018/0320909 A1* | 11/2018 | Ha | F24F 11/76 |
| 2019/0275455 A1* | 9/2019 | Choi | B01D 46/48 |
| 2020/0408433 A1* | 12/2020 | Gyeong | F24F 11/79 |
| 2021/0010706 A1* | 1/2021 | Gyeong | F24F 11/50 |
| 2021/0348623 A1* | 11/2021 | Fukumasu | F04D 29/646 |
| 2021/0356163 A1* | 11/2021 | Chun | F24F 1/005 |

FOREIGN PATENT DOCUMENTS

| | | |
|---|---|---|
| CN | 101344284 A | 1/2009 |
| CN | 101672508 A | 3/2010 |
| CN | 102589045 A | 7/2012 |
| CN | 104748339 A | 7/2015 |
| JP | 5617714 A | 2/1981 |
| JP | 5477061 B2 | 4/2014 |
| JP | 6289663 B2 | 3/2018 |
| JP | 6363811 B1 | 7/2018 |
| KR | 10-0125750 | 4/1998 |
| KR | 1020060095683 A | 9/2006 |
| KR | 10-2012-0064492 A | 6/2012 |
| KR | 10-2013-0043983 A | 5/2013 |
| KR | 10-2014-0019106 A | 2/2014 |
| KR | 10-1561738 B1 | 10/2015 |
| KR | 10-2017-0009701 A | 1/2017 |

\* cited by examiner

AIR CONDITIONER

This application is a National Stage entry of International Application No. PCT/KR2019/002673, filed Mar. 7, 2019, which claims priority to Korean Patent Application No. 10-2018-0026963, filed on Mar. 7, 2018, both of which are incorporated by reference for all purposes as if fully set forth herein.

TECHNICAL FIELD

The present disclosure relates to an air-conditioner and a control method thereof, and more particularly, to an air-conditioner capable of efficiently controlling an air flow and a control method thereof.

BACKGROUND ART

Air-conditioners are installed to provide human beings with a more comfortable indoor environment by discharging cold and hot air in a room to adjust an indoor temperature and purify indoor air to thereby create a comfortable indoor environment.

In general, an air-conditioner includes an indoor unit including a heat exchanger and installed in a room and an outdoor unit including a compressor and a heat exchanger to supply a refrigerant to the indoor unit.

In the air-conditioner, the indoor unit including the heat exchanger and the outdoor unit including the compressor and the heat exchanger are separately controlled, and the air-conditioner is operated by controlling power supplied to the compressor or the heat exchanger. In addition, in the air-conditioner, at least one indoor unit may be connected to the outdoor unit, and the air-conditioner is operated in a cooling or heating mode by supplying a refrigerant to the indoor unit according to a requested operating state.

Such an air-conditioner generally includes an air volume unit provided at an outlet to adjust an air volume discharged in a room. An air volume may be changed by operating an air volume setting button provided in a remote controller or the like.

If a wind direction controller such as a vertical vane or a horizontal vane is used, it is difficult to freely control an air flow due to the vane moving in one dimension. Therefore, a method that may more efficiently control an air flow is required.

In addition, in case where the air-conditioner includes one or more opening and closing structures such as a door, collision and failure may occur between structures in an opening and closing process. Therefore, a method that may prevent collision, failure, and noise between structures that may occur during the opening and closing process, while efficiently operating the air-conditioner, is required.

DISCLOSURE

Technical Problem

The present disclosure provides an air-conditioner capable of preventing collision, failure, and noise between structures that may occur during an opening and closing process, and a control method thereof.

Furthermore, the present disclosure provides an air-conditioner capable of efficiently controlling an air flow, and a control method thereof.

Furthermore, the present disclosure provides an air-conditioner capable of providing various functions such as a voice recognition function and a humidification function, and a control method thereof.

Furthermore, the present disclosure provides an air-conditioner capable of storing and managing internal modules in a clean and safe manner when not in operation, and a method of operating the same.

Technical Solution

In the air-conditioner according to the present disclosure, a circulator door may be opened and closed and a circulator module may be moved.

In an aspect, an air-conditioner includes: a front panel forming an appearance of a front portion; a circulator door disposed at the front panel and moving in an up-down direction so as to be opened and closed; a circulator module moving backward based on a product OFF command and moving forward based on a product ON command; and a controller controlling the circulator door to move in a downward direction so as to be opened and the circulator module to move forward based on the product ON command, whereby the circulator door and the circulator module may be efficiently controlled.

In another aspect, there is provided an air-conditioner in which a circulator door and a circulator module may be efficiently controlled using sensing data sensed by sensors at the time of product ON/OFF, and a collision and failure that may occur in a process of opening and closing a circulator door may be prevented.

In another aspect, an air-conditioner includes: a front panel forming an appearance of a front portion; a circulator door disposed at the front panel and opened and closed; a circulator module moving backward based on a product OFF command and moving forward based on a product ON command; and a controller controlling the circulator door to be opened and the circulator module to move forward based on the product ON command, whereby the circulator door and the circulator module may be efficiently controlled.

Advantageous Effects

In accordance with the embodiment of the present disclosure, in performing communication between UEs (e.g., V2X communication), pieces of specific information received from a plurality of UEs may be prevented from being redundantly included in a V2X message to be subsequently transmitted to the UEs.

According to at least one of the embodiments of the present disclosure, the air-conditioner and the control method for preventing collision, failure, and noise that may occur in a circulator door opening and closing process may be provided.

In addition, according to at least one of the embodiments of the present disclosure, at the time of product ON/OFF, the circulator module and the circulator door may be efficiently controlled by using sensing data sensed by the sensors.

In addition, according to at least one of the embodiments of the present disclosure, an air flow may be variously and efficiently controlled.

In addition, according to at least one of the embodiments of the present disclosure, various functions such as a voice recognition function and a humidification function may be provided.

In addition, according to at least one of the embodiments of the present disclosure, it is possible to cleanly and safely store and manage internal modules when not in operation.

In addition, according to at least one of the embodiments of the present disclosure, since the air-conditioner operates according to detected location information of the user, user convenience may be improved.

Meanwhile, various other effects will be disclosed directly or implicitly in the detailed description according to the embodiment of the present disclosure to be described later.

MODE FOR DISCLOSURE

Figure 1:
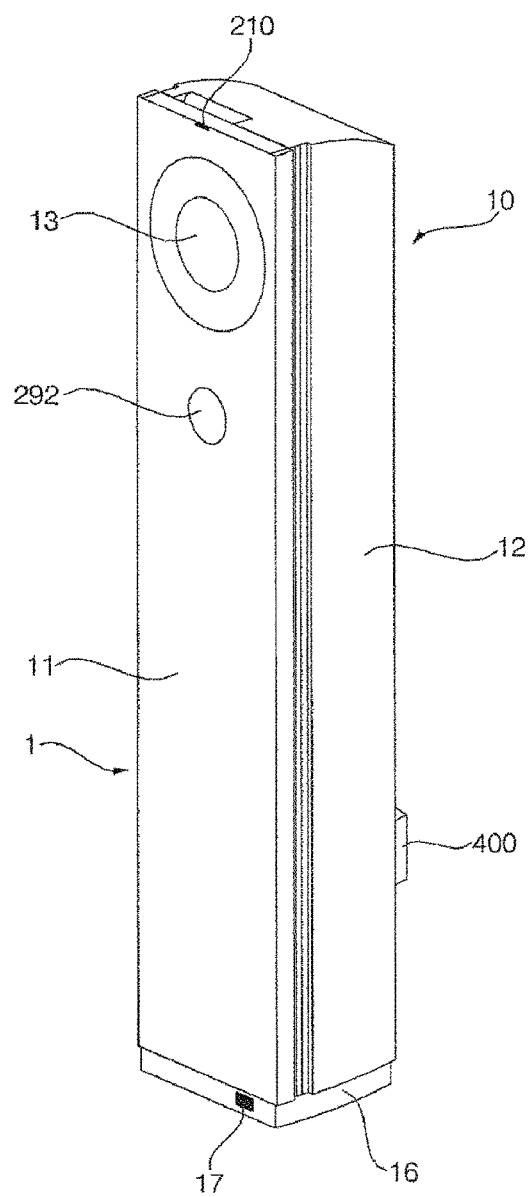
FIG. 1 is a view illustrating an appearance of an air-conditioner according to an embodiment of the present disclosure.

Hereinafter, embodiments of the present disclosure will be described in detail with reference to the accompanying drawings. The present disclosure may, however, be embodied in many alternate forms and should not be construed as limited to the embodiments set forth herein.

For simplicity and clarity of description, illustration of components not associated with the description is omitted in the drawings, and the same or extremely similar elements are denoted by the same reference numerals throughout the specification.

In the following description, usage of suffixes such as 'module', 'part' or 'unit' used for referring to elements is given merely to facilitate explanation of the present disclosure, without having any significant meaning by itself. Therefore, the 'module' or 'part' or 'unit' may be used in combination.

FIG. 1 is a view illustrating an appearance of an air-conditioner according to an embodiment of the present disclosure, and specifically illustrating an indoor unit of an air-conditioner according to an embodiment of the present disclosure.

Figure 2:
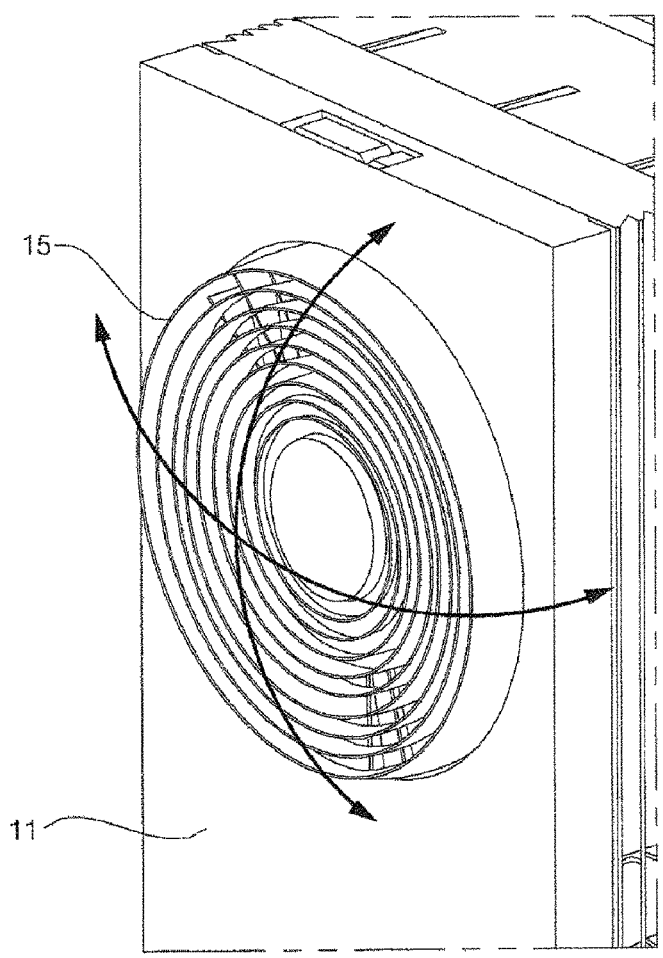
FIG. 2 is a view showing a state in which a circulator door of the air-conditioner of FIG. 1 is open.
Figure 3:
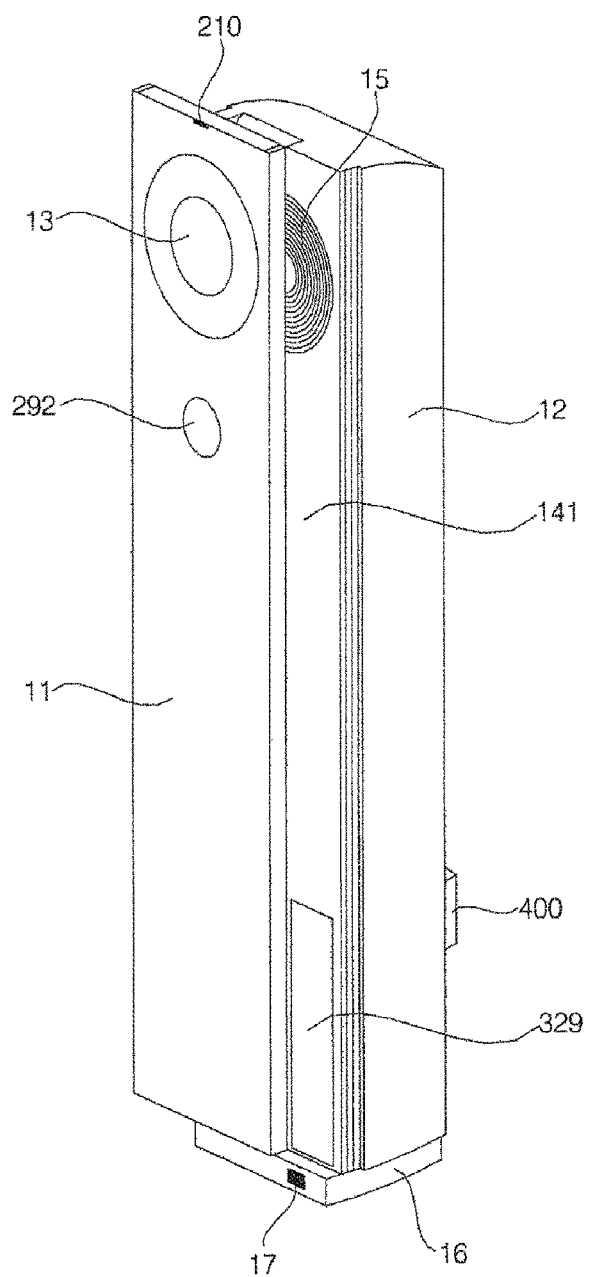
FIG. 3 is a view showing a state in which a front panel of the air-conditioner of FIG. 1 is open.

FIG. 2 is a view showing a state in which a circulator door of the air-conditioner of FIG. 1 is open, and FIG. 3 is a view showing a state in which a front panel of the air-conditioner of FIG. 1 is open.

The air-conditioner may include an indoor unit configured as a heat exchanger and installed in a room and an outdoor unit including a compressor and a heat exchanger to supply a refrigerant to the indoor unit.

Referring to FIGS. 1 to 3, a main body 10 of the indoor unit may be provided in the room and connected to the outdoor unit (not shown) through a refrigerant pipe (not shown).

The air-conditioner 1 according to an embodiment of the present disclosure may include a front panel 11 that forms an appearance of a front portion and a circulator door 13 which is disposed on the front panel 11 and may be opened and closed.

The main body 10 may include a base 16, a cabinet 12, and a front panel 11. The front panel 11 forms an appearance of the front portion of the main body 10, and the cabinet 12 may be installed to be positioned above the base 16.

In addition, a circulator door 13 may be installed on the front panel 11.

The circulator door 13 may move in an up-down direction so as to be opened and closed.

According to an embodiment, the circulator door 13 may be configured to move in the up-down direction so as to be opened and closed.

Alternatively, the circulator door 13 may include two or more separate doors.

For example, the circulator door 13 may include a left door and a right door, and at the time of opening operation, the left door may move to the left and the right door may move to the right so as to be opened. A closing operation may be performed by moving the doors in the opposite directions of the opening operation.

Alternatively, the circulator door 13 may include an upper door and a lower door, and at the time of an opening operation, the upper door may move upward and the lower door may move downward so as to be opened. The closing operation may be performed by moving the doors in the opposite directions of the opening operation.

The indoor unit may include an air inlet (not shown) and an air outlet (not shown), air-condition air intaken through the air inlet therein, discharge the air-conditioned air through the air outlet.

For example, an inlet (not shown) may be provided on a rear surface of the main body 10, and an outlet (not shown) may be provided on an upper front portion of the main body 10.

In addition, the inlet and the outlet may be provided at different positions of the main body 10. For example, the outlet may be provided on a side surface of a lower portion of the main body 10. In addition, a plurality of outlets may be formed on an upper front portion of the main body 10, a lower side surface of the main body 10, and the like.

The inlet may be formed at one or more positions of a rear surface, a lower front surface, and a side surface of the main body 10.

A filter unit (not shown) may be installed at the inlet to filter out foreign matter such as dust or the like contained in intaken air. In addition, a cleaning module 400 for cleaning the filter unit may be disposed at the main body 10.

The outlet may be opened and closed by the circulator door 13.

A circulator module 15 may be provided inside the outlet, that is, behind the closed circulator door 13. The circulator module 15 may generate a blowing force so that air is intaken through the inlet and air is discharged through the outlet.

The circulator module 15 is installed in the main body 10 and may discharge air through an outlet exposed as the circulator door 13 is opened during an operation.

In addition, the circulator module 15 may move forward to the outlet open a the circulator door 13 is opened, and operate. For example, after at least a part of the circulator module 15 moves forward to pass through a circular outlet opened as the circulator door 13 moves in a downward direction, a circulator fan of the circulator module 15 may rotate to operate.

As described above, in the present disclosure, the outlet may refer to an opening through which at least a portion of the circulator module 15, which is a discharge unit for discharging air, passes.

The circulator door 13 may open and close the outlet. The circulator door 13 opens and closes a main outlet and may be provided so that air treated in the air-conditioner such as heat exchanged air and purified air is discharged to the outside.

The circulator door 13 is opened when the main body operates, so that the circulator module 15 is exposed to the outside to discharge air through the outlet, and is closed to close the outlet when the operation is completed. A space in which the circulator door 13 is accommodated may be provided on an inner side or on a rear surface of the front panel 11 when the outlet is opened.

A moving unit (not shown) for moving the circulator door 13 may be installed on one inner surface of the front panel 11. For example, on the inner surface of the front panel 11, a circulator door motor, a gear member for moving the circulator door 13 in an upward or downward direction according to rotation of the circulator door motor, a rail member, and the like may be provided.

Meanwhile, a step motor that is inexpensive and easy to control may be used as a circulator door motor. In this case, the circulator door motor may be referred to as a circulator door step motor.

The circulator door 13 may be configured to move in an upward direction or downward direction so as to be opened inside the main body 10. Since the circulator door 13 is disposed on an upper side of the front panel 11 of the main body 10, it is more preferable in terms of space usage that the circulator door 13 is configured to move in the downward direction so as to be opened.

Alternatively, the circulator door 13 may be configured to move backward toward an inner side of the main body and subsequently move in the upward direction or downward direction so as to be opened. Also, in this case, it is more preferable in terms of space usage that the circulator door 13 is configured to move backward toward the inner side of the main body 10 and subsequently move in the downward direction so as to be opened.

Hereinafter, an example in which the circulator door 13 moves in an up-down direction so as to be opened and closed will be mainly described, but the circulator door 13 may move backward in the inward direction and subsequently move in the downward direction so as to be opened, and the circulator door 13 may move in the upward direction and subsequently move forward so as to be closed.

When the circulator door 13 is opened, the circulator module 15 may move forward in the forward direction toward the front panel 11 to discharge air.

In addition, when the operation terminates, the circulator module 15 may move backward to the inside of the main body 10 and closes the outlet by the movement of the circulator door 13.

In some cases, a blower fan (not shown) for assisting blowing power may be further installed in the main body 10.

In addition, the air-conditioner may further include a plurality of blower fans in addition to the circulator module 15 in the main body 10. For example, a plurality of blower fans may be disposed below the circulator module 15.

Meanwhile, an auxiliary outlet (not shown) may be further installed on the side of the cabinet 12. In addition, a wind direction adjusting unit for adjusting a wind direction of discharged air may be disposed in the auxiliary outlet.

The related art air-conditioners have limitations in discharging air to a long distance even when a maximum air volume is set. However, according to the present disclosure, by providing the circulator module 15 on the top, it is easier to send wind over a long distance.

In addition, since the circulator module 15 is positioned at a final stage in an air discharge path, heat-exchanged air and purified air may be directly discharged to a remote area.

In the existing air-conditioners, air flow control is often performed using a vertical vane or a horizontal vane in many cases. Therefore, in order for the air-conditioner to send wind to a desired area, a vane moving one dimensionally must be used.

In the existing air-conditioner, an air flow may be controlled only one dimensionally by using a one-dimensional vane. That is, since it is controlled only in the left-right or up-down directions, two-dimensional air flow control such as lower left or upper right is impossible.

Referring to FIGS. 1 to 3, in the present disclosure, the circulator module 15, which is a discharge unit, may be configured to rotate two-dimensionally after the circulator door 13 is opened. For example, the circulator module 15 may include a rotating part including a two-axis rotating structure using a double joint gear rack structure to thereby freely rotate in various directions.

Accordingly, the circulator module 15 may rotate in a place where a user wants, thereby controlling an air flow.

In other words, in the related art, an air flow is controlling by causing air to directly hit the vane using the vane, but in the present disclosure, the entire circulator module 15 rotates to allow air flow control in various ways.

In addition, after the entire circulator module 15 rotates, wind may be sent to a place desired by the user to perform intensive cooling, thereby further increasing comfort and satisfaction of the user.

The display module 292 may be provided on the front panel 11.

The display module 292 may display operating state and setting information and may be configured as a touch screen to receive user commands. According to an embodiment, the front panel 11 may be provided with an operation unit (not shown) including at least one input unit of a switch, a button, or a touch pad.

In addition, a proximity sensor (not shown) and a remote control receiver (not shown) may be provided on one side of the display module.

According to an embodiment, the display module 292 may further include one or more lightings.

A proximity sensor 17 may be installed on the base 16. The proximity sensor 17 may detect a user approaching the main body 10 and generate and output a signal corresponding to the user's approach.

According to an embodiment, when a proximity signal corresponding to a user's approach is input from the proximity sensor 17, the display module 292 may be activated to display operation information and at least lighting provided in the main body 10 may operate.

Meanwhile, the proximity sensor 17 may be disposed at a predetermined lower region of the front panel 11.

In addition to the proximity sensor 17, the air-conditioner according to an embodiment of the present disclosure may further include a proximity sensor (not shown) that detects a human body separately. In this case, the proximity sensor 17 disposed at the relatively lower side may be referred to as a bottom proximity sensor, and the proximity sensor disposed at the relatively upper side may be referred to as an top proximity sensor.

Meanwhile, a vision module 210 including at least one camera may be installed at an upper portion of the front panel 11. In addition, an audio input unit (not shown) and an audio output unit (not shown) may be installed on the front panel 11.

The main body 10 may include a heat exchanger (not shown) that exchanges intaken air with a refrigerant therein.

The front panel 11 may slide to the left or right so as to move. Therefore, the front panel 11 may also be referred to as a sliding door.

The front panel 11 is mounted by a sliding unit provided in the cabinet 12 to move left and right. A part of the inner panel 141 of the main body may be exposed to the outside by the movement of the front panel 11.

For example, the cabinet 12 may include a sliding door step motor, a gear member for moving the front panel 11 in the left or right direction according to rotation of the sliding door step motor, a rail member, and the like.

The circulator module 15 is accommodated in the inner panel 141, and a moving unit (not shown) for moving the circulator module 15 may be installed in the inner panel 141.

According to an embodiment, the circulator module 15 may include a circulator fan (not shown), a circulator rotating unit (not shown) for rotating the circulator so that a direction in which a circulator fan (not shown) faces is changed, and a circulator moving unit (not shown) capable of moving at least the circulator fan (not shown).

The inner panel 141 may be provided with a humidification water tank 329 of a humidifying module at a lower portion thereof. The water tank 329 may be exposed to the outside as the front panel 11 moves in the left or right direction so as to be opened.

Figure 4:
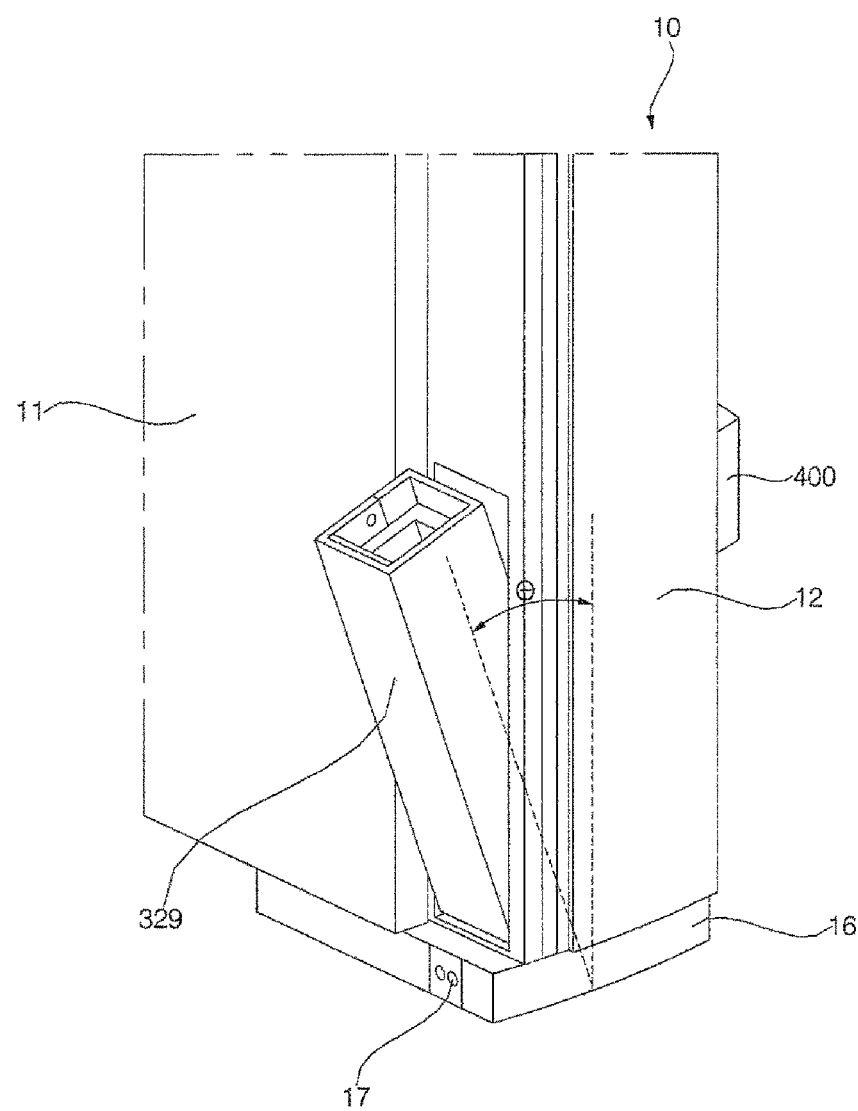
FIG. 4 is a view showing a humidification water tank of the air-conditioner of FIG. 1.

FIG. 4 is a view showing a humidification water tank of the air-conditioner of FIG. 1.

Referring to FIG. 4, the humidification water tank 329 may be exposed to the outside as the front panel 11 moves to the left or right.

In a certain region of the humidification water tank 329, a slot through which water may be supplied may be provided. According to an embodiment, the slot may be open, or a cover capable of opening and closing at least a portion of the slot may be disposed.

The water tank 329 may have a moving shaft provided at a lower portion thereof and may be connected to the cabinet 12. An upper portion of the water tank 329 may be moved to protrude forward with respect to the lower moving shaft so as to open the slot. The water tank 329 may be tilted to the front so that the upper portion thereof forms a predetermined angle $\theta$ with the inner panel 141.

In addition, the water tank 329 may be separated from the main body 10.

A sensor for detecting whether the water tank is mounted may be provided in the main body 10.

When the user's approach is detected by the proximity sensor 17, the water tank 329 may automatically move according to a proximity signal to open the slot.

The water tank 329 may move as the handle (not shown) is pulled toward the front to open the slot.

When a fixing portion (not shown) is pressed inward to be released, the slot of the water tank 329 may be opened.

In addition, as the front panel 11 is slidably opened, the water tank 329 may automatically rotate to open the slot.

A water level indicator (not shown) indicating a water level of the water tank may be provided at a portion of the inner panel 141 or the water tank 329.

In addition, the water tank 329 may be configured to check the amount of water therein. For example, the water tank 329 may be formed of a transparent material. A certain portion of the front surface of the water tank may be formed of a transparent material. In addition, the water tank 329 may be formed entirely of a transparent material.

Figure 5:
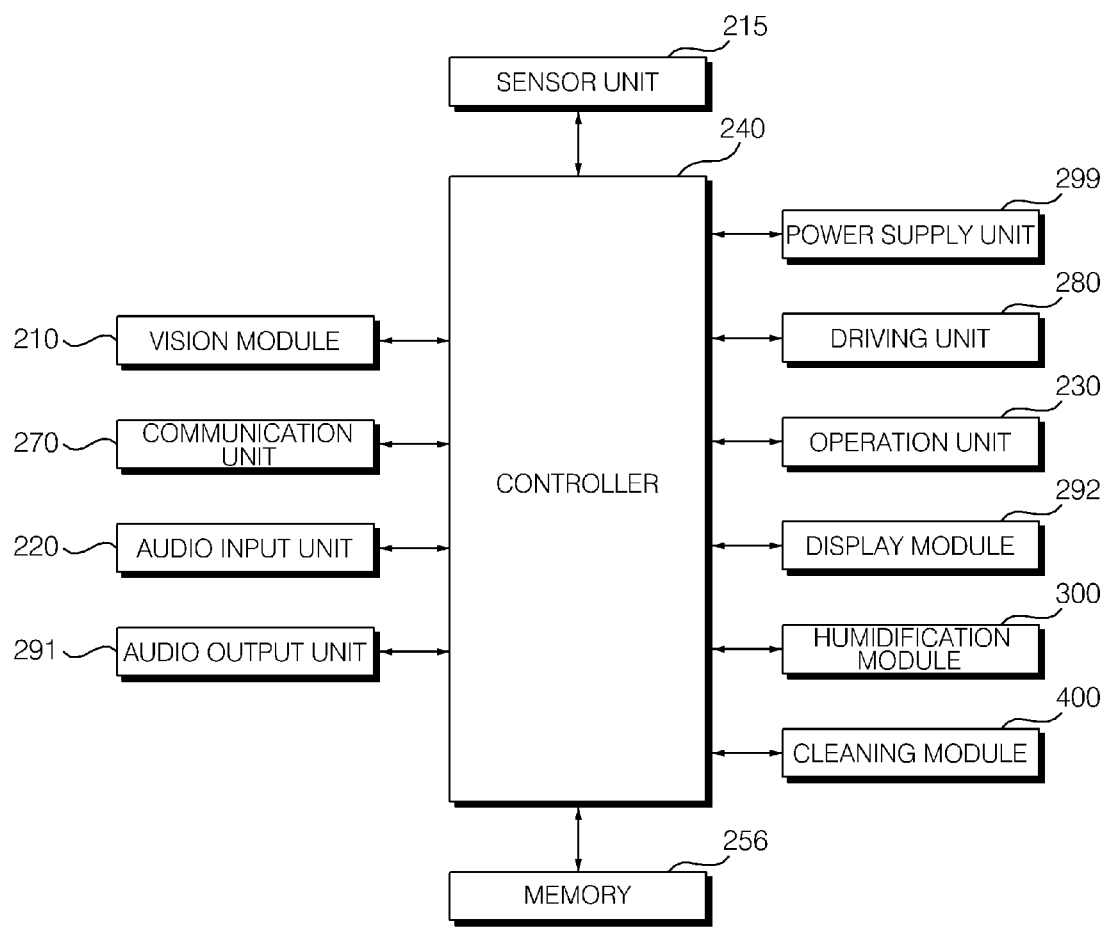
FIG. 5 is a block diagram showing a control relationship between main components of an air-conditioner according to an embodiment of the present disclosure.

FIG. 5 is a block diagram showing a control relationship between main components of an air-conditioner according to an embodiment of the present disclosure.

Referring to FIG. 5, the air-conditioner according to an embodiment of the present disclosure may include a sensor unit 215 including one or more sensors sensing various data, a memory 256 storing various data, a communication unit 270 for wireless communication with another electronic device, the cleaning module 400, a humidification module 300, a controller 240 controlling an overall operation, and a driving unit 280 controlling an operation of the heat exchanger, a valve, a wind direction adjusting unit, and the like provided in the main body 10 under the control of the controller 240.

For example, the sensor unit 215 may include one or more temperature sensors sensing indoor and outdoor temperatures, a humidity sensor sensing humidity, and a dust sensor sensing air quality, and the like.

A temperature sensor is installed at the inlet to measure an indoor temperature, installed inside the main body 10 to measure a heat exchange temperature, and installed at one side of the outlet to measure a temperature of discharged air, and installed at a refrigerant pipe to measure a refrigerant temperature.

According to an embodiment, the sensor unit 215 may include one or more human body detection sensors. For example, the sensor unit 215 may include a proximity sensor 17.

The proximity sensor 17 may detect a person or an object approaching within a predetermined distance.

In addition, the proximity sensor 17 may detect the presence of the user and a distance to the user.

The proximity sensor 17 may be installed on a lower portion of the main body 10, a front portion of the base 16 or the front panel 11 and may also be installed adjacent to the display module 292.

The proximity sensor 17 may input an access signal to the controller 240 when a predetermined object or person approaches within a predetermined distance. The proximity sensor 17 may detect the user approaching the main body 10 and generate and output a signal corresponding to the user's approach.

In addition, the sensor unit 215 may include one or more position sensors that detect positions of units included in the air-conditioner.

Meanwhile, the controller 240 may control the operation of the air-conditioner based on data sensed by the sensor unit 215.

The memory 256 stores various information necessary for the operation of the air-conditioner. Control data for controlling the operation, data regarding an operation mode, data sensed by the sensor unit 215, and data transmitted/received through the communication unit may be stored in the memory 256.

The memory 256 may include a volatile or nonvolatile recording medium. The recording medium, which stores data that may be read by a microprocessor, may include a hard disk drive (HDD), solid state disk (SSD), silicon disk drive (SDD), a ROM, a RAM, a CD-ROM, magnetic tapes, floppy disks, optical data storage devices, and the like.

Meanwhile, the memory 256 may store data for speech recognition, and the controller 240 may process a user's voice input signal received through an audio input unit 220 and perform a speech recognition process.

Meanwhile, simple speech recognition may be performed by the air-conditioner, and high-dimensional speech recognition such as natural language processing may be performed by a speech recognition server system.

For example, when a wake up voice signal including a preset wake-up word is received, the air-conditioner may be switched to a state for receiving a voice command. In this case, the air-conditioner may perform only the voice recognition process up to whether or not a wake-up word voice is input, and subsequent voice recognition for the user's voice input may be performed through the speech recognition server system.

Since system resources of the air-conditioner are limited, complex natural language recognition and processing may be performed through the speech recognition server system.

According to an embodiment, a sound source file of a voice command input by the user may be stored in the memory 256, and the stored sound source file may be transmitted to the speech recognition server system through the communication unit 270. Also, the stored sound source file may be deleted when a predetermined time has elapsed or after a predetermined operation is performed.

The communication unit 270 may include one or more communication modules and perform wireless communication with other electronic devices according to a predetermined communication method to exchange various signals.

Here, the predetermined communication method may be a Wi-Fi communication method. Here, the communication module provided in the air-conditioner may be a Wi-Fi communication module, but the present disclosure is not limited to the communication method.

Alternatively, the air-conditioner may include other types of communication modules or a plurality of communication modules. For example, the air-conditioner may include an near-field communication (NFC) module, a ZigBee communication module, a Bluetooth™ communication module, and the like.

The air-conditioner may be connected to a server included in the speech recognition server system or a predetermined external server, a user's mobile terminal, and the like through a Wi-Fi communication module or the like and support smart functions such as remote monitoring, remote control, or the like.

The user may check information on the air-conditioner or control the air-conditioner through a terminal.

In addition, the communication unit 270 may communicate with an access point (AP) device and access a wireless Internet network through the access point device to communicate with other devices.

In addition, the controller 240 may transmit the state information of the air-conditioner, a user's voice command, and the like to the speech recognition server system through the communication unit 270.

Meanwhile, when a control signal is received through the communication unit 270, the controller 240 may control the air-conditioner to operate according to the received control signal.

The driving unit 280 may control the amount of air discharged to the room by controlling rotation of the motor connected to the indoor fans. For example, the driving unit 280 may control rotation of the motor connected to a circulator fan provided in the circulator module 15 and other blower fans provided at a lower end of the circulator fan.

In addition, the driving unit 280 may control driving of the heat exchanger to heat exchange ambient air by evaporating or condensing a refrigerant supplied thereto.

The driving unit 280 may control an operation of the valve, the wind direction adjusting unit, and the like provided in the main body 10 in response to a control command from the controller 240.

According to an embodiment, the controller 240 may directly control a predetermined unit in the air-conditioner.

Meanwhile, the driving unit 280 may include a motor driving unit and include an inverter or the like to drive the motor.

According to an embodiment, the driving unit 280 may provide a driving force so that the circulator module 15 may rotate. In addition, the driving unit 280 may provide power to a circulator moving unit (not shown) so that the circulator module 15 may move. In addition, the driving unit 280 may control opening and closing of a valve installed therein. In some cases, the driving unit 280 may provide a driving force so that the front panel 11 may slide and move to the left or right. According to an embodiment, the driving unit 280 may include a circulator driving unit and a front panel driving unit.

The cleaning module 400 may be installed on the filter unit to remove foreign matter from the filter unit. The cleaning module 400 may include a cleaning robot (not shown). The cleaning robot may intake foreign matter of the filter unit, while moving along a surface of the filter unit. In addition, the cleaning robot may sterilize the filter unit using a sterilization lamp, while cleaning the filter unit. The cleaning module 400 may further include a position sensor that detects a position of the cleaning robot.

The humidification module 300 receives water from the water tank 329, performs humidification to provide moisture, and discharges humidified air to the outside. The humidification module 300 may generate steam to humidify air and allow humidified air to be discharged into the room through the outlet together with the air-conditioned air.

The humidification module 300 may use a vibrating method using vibration, a heating method, or a spraying method for spraying water, and various other humidifying methods may also be used.

The controller 240 may process input/output data, store data in the memory 256, and control data to be transmitted and received through the communication unit 270.

The controller 240 may control the air-conditioner to operate according to an input through the display module 292, the operation unit 230, and the like, and control the driving unit 280 to transmit and receive data to and from the outdoor unit so that cold air air-conditioned by a refrigerant supplied from the outdoor unit may be discharged to the room.

The controller 240 may control the circulator module 15 to discharge air to the outside based on a set operation mode or data measured from the sensor unit 215.

In addition, the controller 240 may control the humidification module 300 to operate so that humidified air may be discharged, and control the cleaning module 400 so that the filter may be cleaned.

The controller 240 may detect an occupant through the sensor unit 215 or the vision module 210 and control an air flow based on detected position information of the occupant.

The controller 240 may monitor an operating state of each module and control the operating state to be output through the display module 292 according to the applied data.

Referring to FIG. 5, an air-conditioner according to an embodiment of the present disclosure may further include a power supply unit 299, a vision module 210, an audio input unit 220 receiving a user's voice command, a display module 292 displaying predetermined information as an image, an audio output unit 291 outputting predetermined information as audio.

The power supply unit 299 may supply operating power to each unit of the air-conditioner. The power supply unit 299 may rectify and smooth connected usage power to generate and supply a voltage required for each unit. In addition, the power supply unit 299 may prevent an inrush current and generate a constant voltage. Further, the power supply unit 299 may supply operating power to the outdoor unit (not shown).

The audio input unit 220 may receive an external audio signal and a user voice command. To this end, the audio input unit 220 may include one or more microphones (MICs). In addition, the audio input unit 220 may include a plurality of microphones to more accurately receive a user's voice command. The plurality of microphones may be arranged at different positions and spaced apart from each other, obtain an external audio signal, and process the obtained audio signal into an electrical signal.

The audio input unit 220 may include a processing unit converting analog sound into digital data or may be connected to a processor to change a user input voice command into data so as to be recognized by the controller 240 or a predetermined server.

Meanwhile, the audio input unit 220 may use various noise cancellation algorithms to remove noise that occurs in the process of receiving a user's voice command.

In addition, the audio input unit 220 may include components for processing an audio signal, such as a filter that removes noise from an audio signal received from each microphone and an amplifier that amplifies a signal output from the filter and outputs the amplified signal.

The display module 292 may display information corresponding to a user's command input, a processing result corresponding to the user's command input, an operation mode, an operating state, an error state, and the like.

According to an embodiment, the display module 292 may have a inter-layer structure with a touch pad to form a touch screen. In this case, the display 292 may be used as an input device capable of inputting information by a user's touch, as well as the output device.

According to an embodiment, the display module 292 may further include a lighting unit that outputs an operating state depending on whether the lighting unit is turned on, a color of light, and whether the lighting unit blinks.

According to an embodiment, the air-conditioner may further include an additional operation unit 230. The operation unit 230 may include at least one of a button, a switch, and a touch input unit and may input user commands or predetermined data to the air-conditioner.

In addition, the audio output unit 291 may output, as audio, a notification message such as a warning sound, an operation mode, an operating state, an error state, and the like, information corresponding to the user's command input, a processing result corresponding to the user's command input, and the like under the control of the controller 240.

Meanwhile, the audio output unit 291 may convert an electrical signal from the controller 240 into an audio signal and output the converted signal. To this end, a speaker or the like may be provided.

The vision module 210, including at least one camera, may capture an image of an indoor environment. The camera is to capture an image of surroundings of the air-conditioner, an ambient environment, and the like, and several cameras may be installed at multiple parts for image capture efficiency.

For example, the camera may include an image sensor (e.g., CMOS image sensor) including at least one optical lens and a plurality of photodiodes (e.g., pixels) on which an image is formed by light passing through the optical lens and a digital signal processor (DSP) that forms an image based on a signal output from the photodiodes. The DSP may generate not only a still image but also a moving image including frames composed of still images.

Meanwhile, an image obtained by the camera may be stored in the memory 256.

According to an embodiment, a user's location may be detected based on the image obtained by the vision module 210.

The vision module 210 is installed on the front panel 11, and in some cases, the vision module 210 may be installed on an upper panel of the cabinet. In addition, the vision module 210 may be accommodated in the main body 10 when not in operation, and may operate after being lifted.

Figure 6:
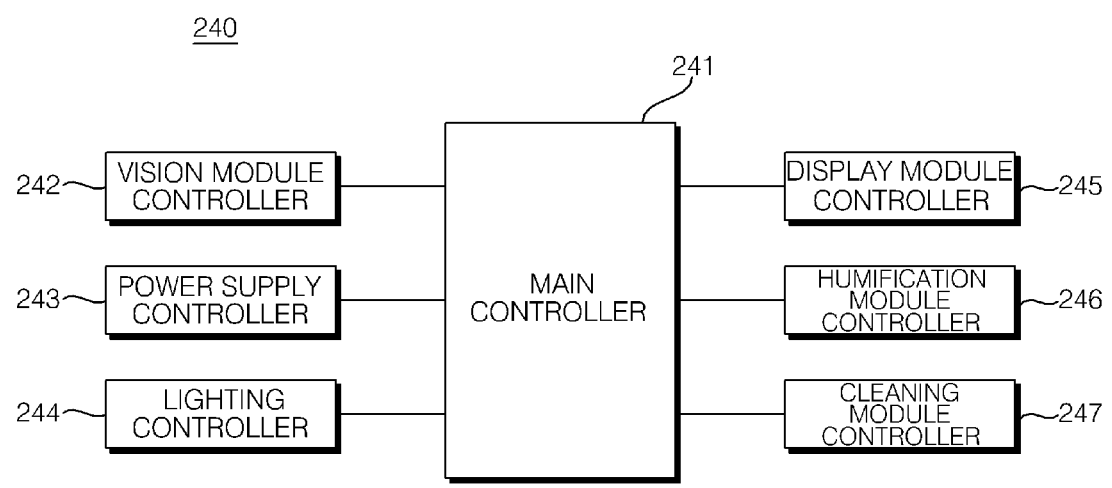
FIG. 6 is a diagram illustrating an internal configuration of a controller according to an embodiment of the present disclosure.

FIG. 6 is a diagram illustrating an internal configuration of a controller according to an embodiment of the present disclosure.

The controller 240 may include one or more microprocessors.

Referring to FIG. 6, the controller 240 may include a main controller 241, a vision module controller 242, a power supply controller 243, a lighting controller 244, a display module controller 245, a humidification module controller 246, a cleaning module controller 247, and the like according to functions.

Each controller 241 to 247 may be configured as one microprocessor, and may be installed at each module. For example, the vision module 210, the cleaning module 400, and the humidification module 300 may be controlled through one microprocessor.

According to an embodiment, the main controller 241 may apply a control command to the other controllers 242 to 247, receive data from each controller, and process the same. The main controller 241 and the other controllers 242 to 247 may be connected by a bus to transmit and receive data.

According to an embodiment, a microprocessor may be installed at each module so that an operation of each module may be processed more quickly. For example, the display module 292 may include a display module controller 245, and the humification module 300 may include a humidification module controller 246 to control the operation.

Meanwhile, the block diagram of the controller 240 illustrated in FIG. 6 is a block diagram for an embodiment of the present disclosure. Each component of the block diagram may be integrated, added, or omitted depending on specifications of the units in the controller 240 and the air-conditioner that are actually realized. That is, if necessary, two or more components may be incorporated as one component, or one component may be divided into two or more components. In addition, the function performed in each block is for explaining an embodiment of the present disclosure and a specific operation or device does not limit the scope of the present disclosure.

Figure 7:
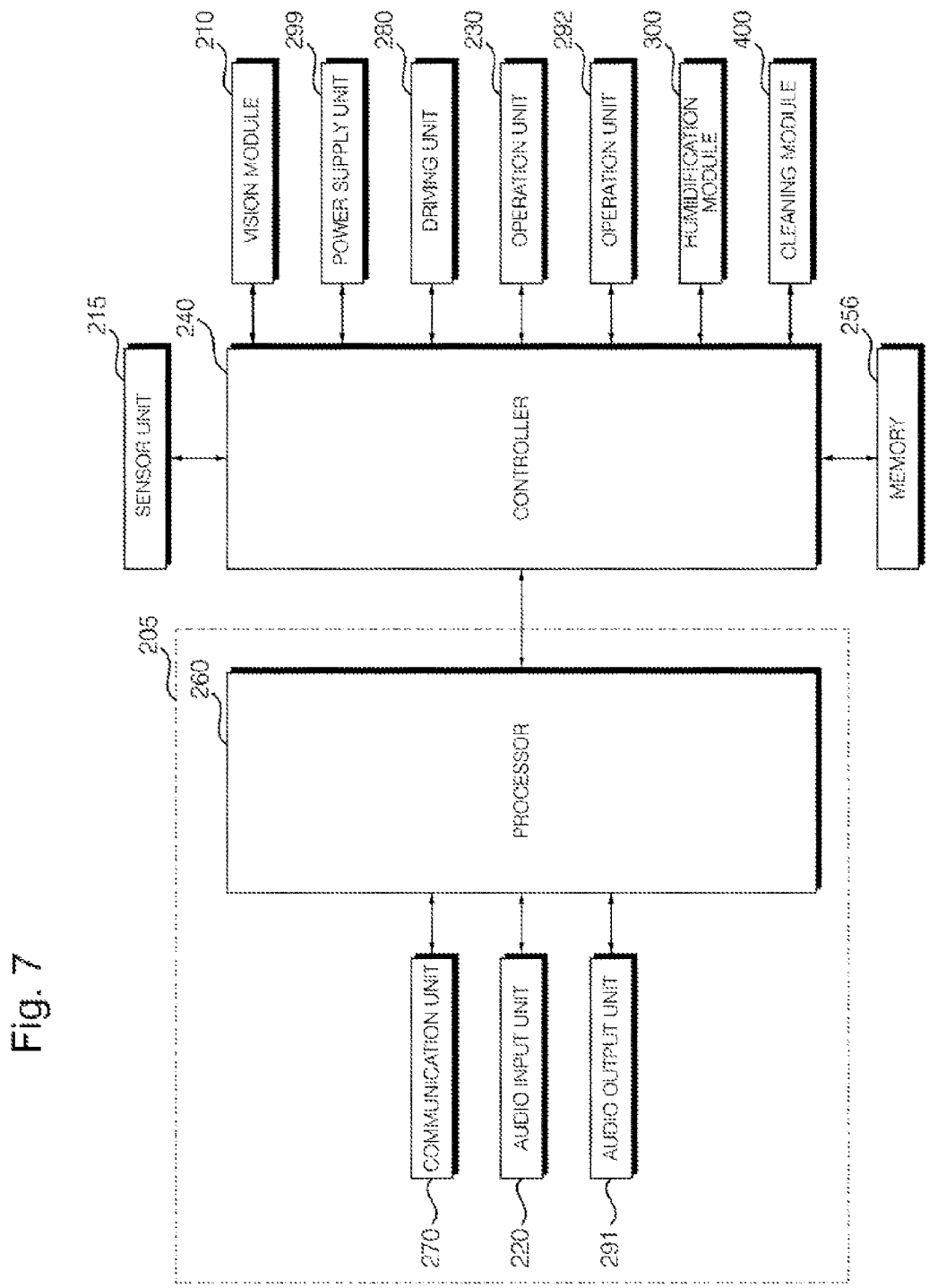
FIG. 7 is a block diagram showing a control relationship between main components of an air-conditioner according to an embodiment of the present disclosure.

FIG. 7 is a block diagram showing a control relationship between main components of an air-conditioner according to an embodiment of the present disclosure.

Referring to FIG. 7, the air-conditioner may include the vision module 210, the sensor unit 215 sensing various data, the audio input unit 220 receiving a user's voice command, the operation unit 230, the memory 256 storing various data, the communication unit 270 for wireless communication with other electronic devices, the driving unit 280 performing an operation realized in the air-conditioner, the display module 292 displaying predetermined information as an image, the audio output unit 291 outputting predetermined information as audio, the humidification module 300, the cleaning module 400, the controller 240 controlling an overall operation, and the processor 260.

The internal block diagram of the air-conditioner of FIG. 7 is similar to that of FIG. 5 but further includes the processor 260 and is different in that the audio input unit 220, the audio output unit 291, the communication unit 270, and the processor are provided in a speech recognition module 205 as a single module.

According to an embodiment, the speech recognition module 205 may include the communication unit 270 and the processor 260, and the audio input unit 220 and the audio output unit 291 may be configured as a separate integral module.

Meanwhile, the processor 260 may control the audio input unit 220, the audio output unit 291, the communication unit 270, and the like.

Hereinafter, the difference from FIG. 5 will be mainly described.

The processor 260 may process a user's voice input signal received through the audio input unit 220 and perform a voice recognition process.

For example, when a wake up voice signal including a preset wake-up word is received, the processor 260 may be switched to a state for receiving a voice command. In this case, the processor 260 may perform only a voice recognition process up to whether or not a wake-up word voice is input, and subsequent voice recognition of the user's voice input may be performed through the speech recognition server system.

The processor 260 may control a user's voice command input after recognition of the wake-up voice signal to be transmitted to the speech recognition server system through the communication unit 270.

In addition, the processor 260 may transmit state information of the air-conditioner, a user's voice command, and the like to the speech recognition server system through the communication unit 270.

Meanwhile, when a control signal is received through the communication unit 270, the processor 260 may transmit the control signal to the controller 240, and the controller 240 may control the air-conditioner to operate according to the received control signal.

As a result, obtaining of voice data, communication with the server system, and outputting of a corresponding sound may be performed through the voice recognition module 205.

Meanwhile, the voice recognition module 205 may be attached to various electronic devices in addition to the air-conditioner. Alternatively, the voice recognition module 205 may be used as a separate device, without being attached to other electronic devices.

The air-conditioner according to an embodiment of the present disclosure may receive a user's voice input, and the speech recognition server system may control the air-conditioner by recognizing and analyzing the user's voice input.

Accordingly, the user may control the air-conditioner, even without operating a portable terminal and a remote controller.

Figure 8:
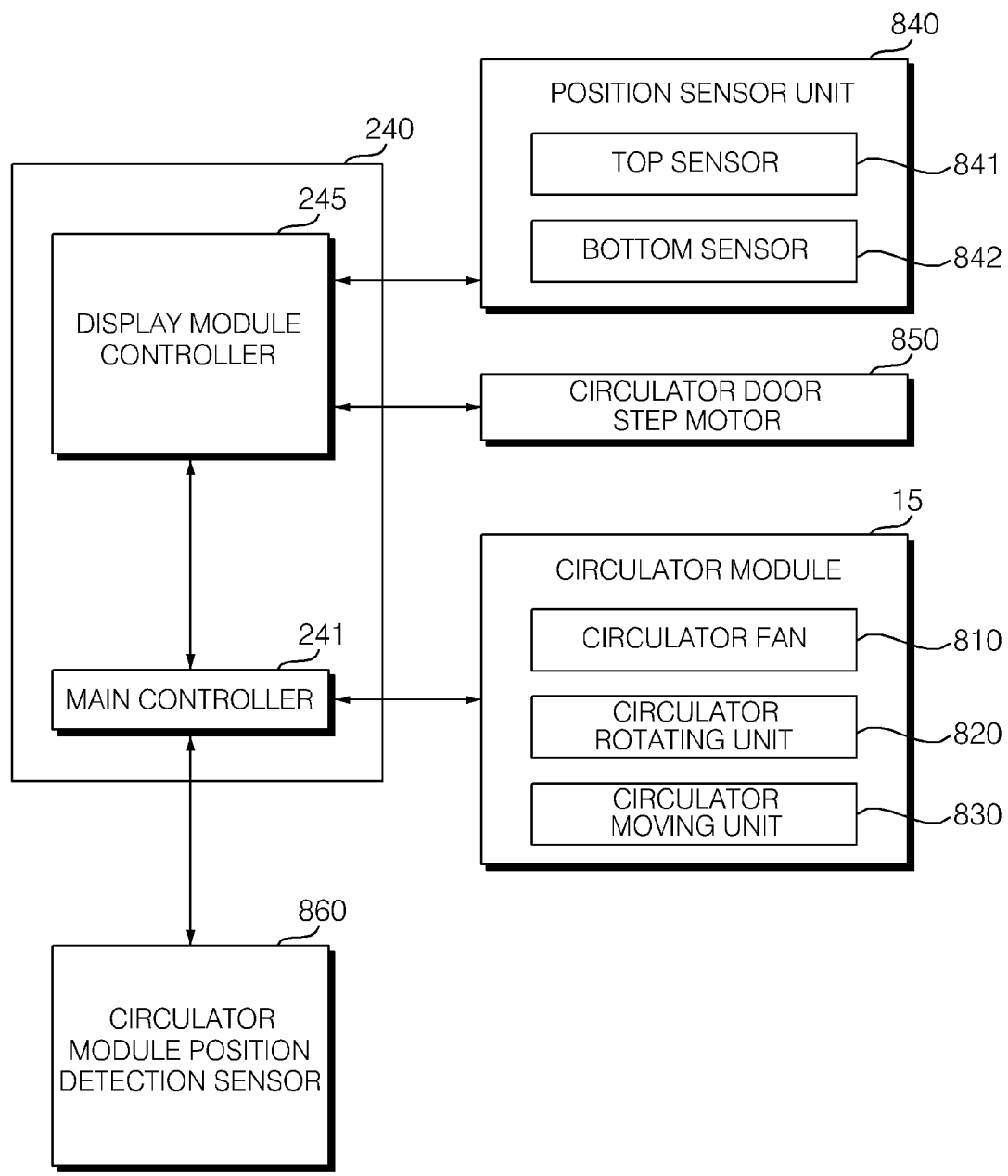
FIG. 8 is a block diagram showing a control relationship between main components of an air-conditioner according to an embodiment of the present disclosure.

FIG. 8 is a block diagram showing a control relationship between main components of an air-conditioner according to an embodiment of the present disclosure.

Referring to FIGS. 1 to 8, the air-conditioner according to an embodiment of the present disclosure may include a front panel 11 forming an appearance of a front portion, a circulator door 13 disposed at the front panel 11 and moving in an up-down direction so as to be opened and closed, a circulator module 15 moving backward based on a product OFF command and moving forward based on a product ON command, and a controller 240 controlling the circulator door 13 to move in a downward direction so as to be opened and the circulator module 15 to move forward based on the product ON command.

In the present disclosure, the product OFF command may be a power OFF input for turning off the air-conditioner. Alternatively, the product OFF command may be a command corresponding to a specific mode in which the circulator module 13 is not operated and the circulator door 13 is closed.

In the present disclosure, the product ON command may be a power ON input for applying power to the air-conditioner. Alternatively, the product ON command may be a command corresponding to a specific mode in which the circulator door 13 is opened and the circulator module 15 operates.

Meanwhile, the air-conditioner according to an embodiment of the present disclosure may include a moving unit (not shown) for moving the circulator door 13. The moving unit (not shown) for moving the circulator door 13 may be installed on one inner surface of the front panel 11.

The air-conditioner according to an embodiment of the present disclosure may move a mechanism structure using a step motor. The step motor rotates in proportion to the number of pulses and changes in rotation speed in proportion to an input frequency. Therefore, since a movement amount of the mechanism structure is proportional to the number of pulses, controlling is simplified and low cost is incurred.

Therefore, a step motor may be used as the circulator door motor 850. In this case, the circulator door motor 850 may be referred to as a circulator door step motor 850.

In addition, an inner surface of the front panel 11 may be provided with the circulator door step motor 850 and a gear member, a rail member, a stopper member, and the like for moving the circulator door 13 in an upward or downward direction according to rotation of the circulator door step motor 850.

The controller 240 may open or close the circulator door 13 by rotating the circulator door step motor 850.

The circulator module 15 may include a circulator fan 810, a circulator rotating unit 820 rotating the circulator fan 810 so that a direction in which the at least circulator fan 810 faces may be changed, and a circulator moving unit 830 moving at least the circulator fan 810.

The circulator rotating unit 820 may include a double-shaft rotating structure using a double joint and a gear rack structure. Accordingly, the entire circulator module 15 or at least the circulator fan 810 may freely rotate in various directions.

The circulator moving unit 830 may include a motor and a mechanism structure for the circulator module 15 to move forward or backward. For example, the circulator moving unit 830 may include a step motor, and a gear member, a rail member, and the like for moving the circulator module 15 according to rotation of the step motor, and the like.

The controller 240 may control the operation of the circulator module 15.

Figure 9:
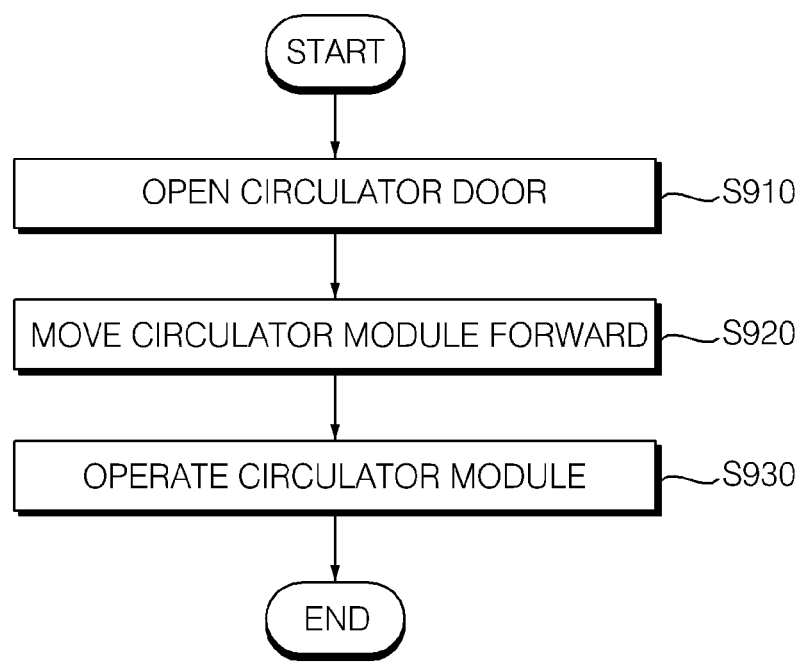
FIG. 9 is a flowchart illustrating a control method of an air-conditioner according to an embodiment of the present disclosure.

FIG. 9 is a flowchart illustrating a control method of an air-conditioner according to an embodiment of the present disclosure.

Referring to FIG. 9, the controller 240 may control the circulator door 13 to move downward and be opened based on the product ON command (S910).

Thereafter, the controller 240 may control the circulator module 15 accommodated in the main body 10 to move forward (S920) and control the circulator module 15 to operate according to a predetermined operation mode (S930).

The controller 240 may control the circulator door 13 to move downward and be opened based on the product ON command and control the circulator door 13 to move upward and be closed based on the product OFF command.

Meanwhile, when the circulator door 13 slidably moves in the up-down direction so as to be opened or closed, noise may occur when overswing to the stopper.

In addition, when the circulator module 15 moves forward or backward, noise due to overswing may occur.

In addition, if the circulator door 13 and the circulator module 15 are not properly controlled, the circulator door 13 and the circulator module 15 may collide, thereby causing a failure.

The occurrence of such noise, collision, and failure may cause discomfort to the user and degrade product reliability.

Therefore, the present disclosure proposes an operation procedure for the circulator module 15 not to collide with the circulator door 13 in the power ON or OFF process and a control method of the circulator module 15.

In addition, according to an embodiment of the present disclosure, a compensation procedure for preventing malfunction by establishing operation order when power OFF process is not performed and application of power after an emergency situation.

Accordingly, the present disclosure may prevent a collision, reduce noise, and may effectively cope with an abnormal situation.

To this end, before the circulator door 13 moves in the downward direction, the controller 240 may perform control to perform an initialization operation to initialize positions of the circulator module 15 and the circulator door 13.

That is, during the product ON/OFF process, the controller 240 may initialize positions of the circulator module 15 and the circulator door 13 and subsequently control the circulator module 15 and the circulator door 13 to perform an operation according to the product ON/OFF command so that the circulator module 15 and the circulator door 13 do not collide.

In addition, the sensor unit 215 may include a position detection sensor for detecting positions of the circulator module 15 and the circulator door 13.

For example, the sensor unit 215 may include a position sensor unit 840 including an top position sensor 841 and a bottom position sensor 842 disposed on an inner surface of the front panel 11 and detecting movement of the circulator door 13.

In addition, the sensor unit 215 may include a circulator module position detection sensor 860 disposed between the rearmost point and the foremost point of a movement range of the circulator module 15 to detect a position of the circulator module 15.

The present disclosure is not limited to the sensing method of the position sensor unit 840 and the circulator module position detection sensor 860, and various types of sensors may be used.

For example, the top position sensor 841 and the bottom position sensor 842 may be configured as an infrared (IR) transmission/reception module. The infrared (IR) transmission/reception module may be located at a movement start point (highest point) and a movement end point (lowest point) of the circulator door 13 to detect the position of the circulator door 13, and the controller 240 may control the circulator door step motor 850 based on the detected position information.

Alternatively, the position sensor unit 840 may detect whether or not the circulator door 13 is opened or closed and/or a position thereof using a hall IC, a trigger switch, a rotary switch, or the like.

In addition, the circulator module position detection sensor 860 may be disposed between the rearmost point (end) and the foremost point (front end) of the movement range of the circulator module 15.

The circulator module 15 may move backward and forward between the rearmost point (rear end) and the foremost point (front end). At the time of a product OFF operation, the circulator module 15 may move backward to the rearmost point (end) and may be accommodated in the main body 10. In addition, at the time of product ON operation, the circulator module 15 may move forward to the foremost point (front end) to discharge air.

The circulator module position detection sensor 860 may be disposed at a specific position within the movement range of the circulator module 15. Preferably, the circulator module position detection sensor 860 may be disposed at a position spaced from the rearmost point (end) by a first distance. That is, the circulator module position detection sensor 860 may be disposed ahead by the first distance in the direction of the foremost point (front end) from the rearmost point (end). Accordingly, during the initialization process, the amount of movement of the circulator module 15 may be minimized to reduce an operation time.

In addition, the circulator module position detection sensor 860 may be an ON/OFF type sensor. That is, the circulator module position detection sensor 860 may be turned on when an object is detected, and may be turned off when an object is not detected. Also, the circulator module position detection sensor 860 may output a signal corresponding to ON/OFF to the controller 240.

Accordingly, it is possible to effectively detect the position of the circulator module 15 even with one inexpensive ON/OFF type sensor.

Unless otherwise specified in the present disclosure, detecting a predetermined object such as the circulator module 15 may refer to that a sensor such as the circulator module position detection sensor 860 is turned on and the controller 240 checks a signal corresponding to ON of the sensor. It may mean that a signal corresponding to on is confirmed. In addition, when it is described that a predetermined object such as the circulator module 15 is not detected, it may mean that the controller 240 checks a signal corresponding to OFF of the sensor.

Meanwhile, the sensor unit 215 may include the position sensor unit 840 and the circulator module position detection sensor 860, and the controller 240 may control the air-conditioner based on sensing data from the position sensor unit 840 and the circulator module position detection sensor 860.

According to an embodiment, the controller 240 may include a first controller 245 controlling movement of the position sensor unit 840 and the circulator door 13 and a second controller 241 controlling the circulator module 15.

According to an embodiment, the first controller 245 may be a display module controller 245 that controls the display module 292.

A board closest to the top position sensor 841 and the bottom position sensor 842 arranged on the inner surface of the front panel 11 and the circulator door step motor 850 may be a board provided in the display module 292.

Accordingly, since the display module controller 245 provided in the display module 292 receives and processes data sensed by the top position sensor 841 and the bottom position sensor 842 and controls the circulator door step motor, a connection structure may be more simplified and a processing rate may be improved.

Meanwhile, the second controller 241 may be the main controller 241. The main controller 241 may control fan driving, movement, and rotation of the circulator module 15. According to an embodiment, the driving unit 280 may control at least one of fan driving, movement, and rotation of the circulator module 15 under the control of the main controller 241.

The circulator module 15 may operate under the control of the main controller 241. The main controller 241 may smartly control the circulator module 15 according to the user's position detected by the top proximity sensor and/or the vision module 210.

For example, when the user is detected from a remote area, the circulator module 15 rotates to face upward and the circulator fan 810 is controlled to be driven, thereby discharging air farther toward the user in the remote area during cooling and air cleaning.

The circulator module 15 may move backward based on the product OFF command and move forward based on the product ON command.

When a user's product OFF command is received as a voice input or a touch input through the display module 292, the circulator module 15 may move backward and be accommodated in the main body 10.

The main controller 241 may control the circulator door 13 to move downward and be opened based on the product ON command and control the circulator door to move upward and be closed based on the product OFF command.

The display module controller 245 controls the circulator door 13 to move downward and be opened based on the product ON command and control the circulator door 13 to move upward and be closed based on the product OFF command.

In the air-conditioner according to an embodiment of the present disclosure, after the circulator door 13 is opened, the circulator module 15 may move forward and operate.

The controller 240 may control to perform an initialization operation to initialize positions of the circulator module 15 and the circulator door 13, before the circulator door 13 moves downward based on the product ON command.

In the initialization operation, the controller 240 may move the circulator module 15 forward to a position corresponding to a first distance.

When the circulator module 15 is detected by the circulator module position detection sensor 860 disposed at a position corresponding to the first distance, the controller 240 may move the circulator module 860 backward.

That is, by determining whether the circulator module 15 is detected by the circulator module position detection sensor 860 by slightly moving the circulator module 15, whether the circulator module 15 is accurately at an initial position may be determined.

In addition, after determining the initial position, the circulator module 15 may be moved backward and returned to the original position.

If the circulator module 15 is not detected by the circulator module position detecting sensor 860 after the backward movement of the circulator module 15 initialization operation, the controller 240 may complete the circulator module 15 initialization operation and performs an initialization of the circulator door 13.

In the initialization operation of the circulator module 15, the controller 240 may move the circulator module 15 forward and determine whether the circulator module position detection sensor 860 is turned on by detecting the circulator module 15, and move the circulator module 15 backward and determine whether the circulator module position detection sensor 860 is turned off by moving the circulator module 15 backward.

Accordingly, it may be determined whether the circulator module 15 and the circulator module position detection sensor 860 are accurately positioned and whether they properly operate.

Meanwhile, the controller 240 may determine a current position of the circulator door 13 by checking sensing data of the sensor unit 840 before movement of the circulator door 13 and the circulator module 15.

For example, if the circulator door 13 is detected only by the top position sensor 841 disposed at a movement start point (highest point) of the circulator door 13, the controller 240 may determine that the circulator door 13 is closed.

In addition, according to a sensing value from the top position sensor 841, the controller 240 may determine how far the circulator door 13 is from the movement start point (highest point) of the circulator door 13.

Meanwhile, when the circulator door 13 is detected only at the bottom position sensor 842 disposed at a movement end point (lowest point) of the circulator door 13, the controller 240 may determine that the circulator door 13 is open.

In addition, according to a sensing value from the bottom position sensor 842, the controller 240 may determine how far the circulator door 13 is from the movement end point (lowest point) of the circulator door 13.

The controller 240 determines whether the circulator door 13 is detected by the top position sensor 841 and, if the circulator door 13 is at the initial position, the controller 240 may control the circulator door 13 to complete the initialization operation. That is, before an opening operation of the circulator door 13 starts according to the product ON command, the controller 240 may determine the initial position of the circulator door 13, and if there is no abnormality, the opening operation may start.

When the initialization operation is completed, the controller 240 may control the circulator door 13 to be opened and the circulator module 15 to move forward.

When the product OFF command is received and the circulator door 13 is detected by the bottom position sensor 842, the controller 240 may control the circulator door 13 to move upward.

That is, before the closing operation of the circulator door 13 starts according to a product OFF command, the controller 240 may determine the initial position of the circulator door 13, and if there is no abnormality, the closing operation may be started.

Meanwhile, in the initialization process of the circulator door 13 according to the product ON/OFF operation command, an abnormal situation in which the circulator door 13 is not detected may occur. This abnormal situation may occur due to power failure, initialization, mechanism jamming, or the like.

In the initialization process, if the top position sensor 841 and the bottom position sensor 842 do not detect the circulator door 13, the controller 240 may control the circulator door 13 to move in the upward direction.

That is, if both the top position sensor 841 and the bottom position sensor 842 spaced apart from each other do not detect the circulator door 13, the controller 240 may control the circulator door 13 to move in the upward direction, and determine whether the circulator door 13 is detected by the top position sensor 841.

In this case, the controller 240 may control the circulator door step motor 850 to rotate at a preset maximum setting value.

Meanwhile, when the circulator door 13 is detected by the top position sensor 841 according to the upward movement of the circulator door 13, the controller 240 may control revolutions per minute (RPM) of the circulator door step motor 850 to be reduced, thereby reducing overswing and noise that may occur during a process of handling an abnormal situation.

Even in this case, when it is detected by the top position sensor 841 that the circulator door 13 has reached the preset highest point, the controller 240 may control the circulator door step motor 850 to stop.

Meanwhile, if the circulator door 13 is not detected by the top position sensor 841 even with the upward movement of the circulator door 13, the controller 240 may control the circulator door step motor 850 to stop.

In other words, if it fails to detect the circulator door 13 although the circulator door 13 has moved upward to the maximum level to detect the circulator door 13, the circulator door 13 may not be moved any longer.

This situation may be determined as sensor failure. In this case, the audio output unit 291 may output information indicating failure of the position sensor unit 840 as sound. In addition, the display module 292 may display information indicating failure of the position sensor unit 840.

Accordingly, it is possible to flexibly respond to variables such as power failure, initialization, mechanism jamming, or the like and to improve noise of the mechanism overswing.

In addition, after a maximum step of the circulator door step motor 850, in the event of failure of the position sensors 841 and 842 in which a position signal is not obtained, the circulator door step motor 850 is stopped, thereby coping with additional occurrence of noise and failure mode. In addition, it is possible to notify the user of the sensor failure.

Meanwhile, after the circulator module 15 is detected by the circulator module position detection sensor 860 according to the forward movement of the circulator module 15 initialization operation, if detecting of the circulator module 15 is not terminated, the controller 240 may perform control to output information indicating failure of the circulator module position detection sensor 860.

Normally, the circulator module position detection sensor 860 is turned on by detecting the circulator module 15 according to the forward movement of the circulator module 15 initialization operation, and the circulator module position detection sensor 860 is switched to an OFF state according to the backward movement of the circulator module 15.

Therefore, if detecting of the circulator module 15 is not terminated, it may be determined that the circulator module position detection sensor 860 is broken down.

The controller 240 may perform control to output a message indicating that the circulator module position detection sensor 860 is broken down through the display module 292 and/or the audio output unit 291.

In addition, if the circulator module 15 is not detected by the circulator module position detection sensor 860 after the forward movement of the circulator module 15 initialization operation, the controller 240 may control the circulator module 15 to perform a compensation operation.

That is, if the circulator module 15 is not detected by the circulator module position detection sensor 860 in spite of the forward movement of the circulator module 15, it may be determined that an emergency such as power failure or the like occurs and a corresponding compensation operation may need to be performed.

In the compensation operation of the circulator module 15, the controller 240 may control the circulator module 15 to move backward by a second distance greater than the first distance.

In this case, when the circulator module 15 is detected by the circulator module position detection sensor 860, it may be determined that initialization of the circulator module 15 has been properly completed by the compensation operation.

Accordingly, when the circulator door 13 is detected by the top position sensor 841 of the position sensor unit 840, the controller 240 may perform control to complete the initialization operation.

According to an embodiment, the controller 240, after the backward movement of the circulator module 15 compensation operation, the controller 240 may control the circulator module 15 to move backward by a third distance greater than the first distance and smaller than the second distance.

By moving the circulator module 15 backward slightly, the circulator module 15 may be more accurately positioned at the end, which is the rearmost point of the movement range.

Accordingly, the circulator module may be detected by the circulator module position detection sensor 860, and when the circulator door is detected by the top position sensor 841, the controller 240 may perform control to complete the initialization operation.

However, after the circulator module 15 is detected by the circulator module position detection sensor 860 according to the additional backward movement of the circulator module 15 compensation operation, if the detecting of the circulator module 15 is not terminated, the controller 240 may perform control to output information indicating failure of the circulator module position detection sensor 860.

Normally, the circulator module position detection sensor 860 is switched to an OFF state as the circulator module 15 moves backward additionally. Thus, if detecting of the circulator module 15 is not terminated, it may be determined that the circulator module position detection sensor 860 is broken down.

The controller 240 may perform control to output a message indicating that the circulator module position detection sensor 860 is broken down through the display module 292 and/or the audio output unit 291.

In addition, if the circulator module 15 is not detected by the circulator module position detection sensor 860 after the backward movement of the circulator module 15 compensation operation, the controller 240 may perform control to feedback failure information.

If the circulator module 15 has moved, the controller 240 may control the display module 292 and/or the audio output unit 291 to output a message indicating that the circulator module position detection sensor 860 is broken down.

In addition, if the circulator module 15 has not moved, the controller 240 may control the display module 292 and/or the audio output unit 291 to output a message indicating that the circulator module step motor (not shown) is broken down.

In addition, if the circulator door 13 is not detected by the top position sensor 841, the controller 240 may perform control to feedback failure information related to the circulator door 13.

According to an embodiment of the present disclosure, an operation logic for the circulator module 15 not to collide with the circulator door 13 during the product ON/OFF process may be configured.

In addition, according to an embodiment of the present disclosure, a malfunction of the circulator module 15 may be determined according to the operation logic of the circulator module 15.

In addition, according to an embodiment of the present disclosure, it may be determined which of components such as the circulator module 15, the circulator module position detection sensor 860, the circulator door 13, the top position sensor 841, and the like is broken down, and corresponding information may be provided to the user.

In addition, the controller 240 may control the operation of the circulator module 15 based on data detected by the proximity sensor and/or the vision module 210.

According to the present disclosure, it is possible to control air flow optimized for the user's position by controlling driving, movement, and rotation of the circulator module 15 based on the user's position.

FIGS. 10 to 16 are views referred to for a description of a control method of an air-conditioner according to an embodiment of the present disclosure.

Figure 10:
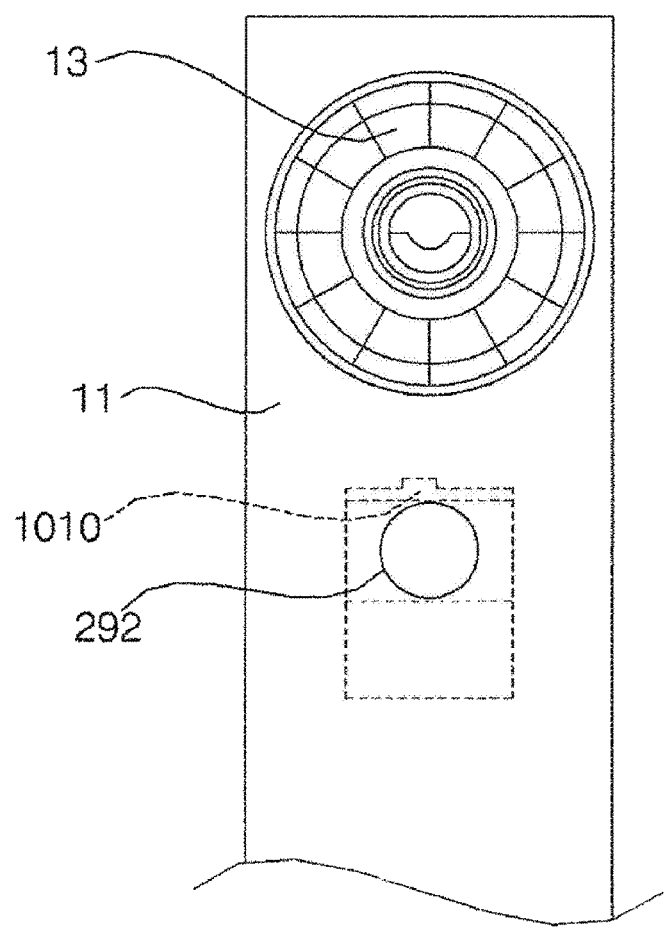
FIGS. 10 to 16 are views referred to for a description of a control method of an air-conditioner according to an embodiment of the present disclosure.
Figure 11:
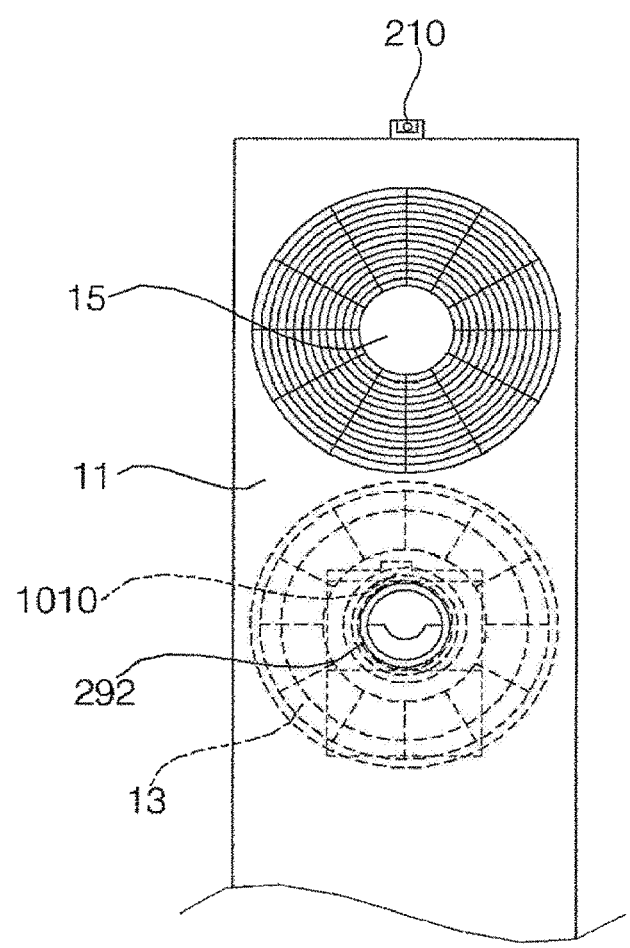

FIG. 10 shows a state in which the circulator door 13 of the air-conditioner according to an embodiment of the present disclosure is closed up to a final closed position (position when completely closed) which is a start point (highest point), and FIG. 11 shows a state in which the circulator door 13 of the air-conditioner according to an embodiment of the present disclosure is open up to a final open position (position when completely opened) which is an end point (lowest point).

Figure 12:
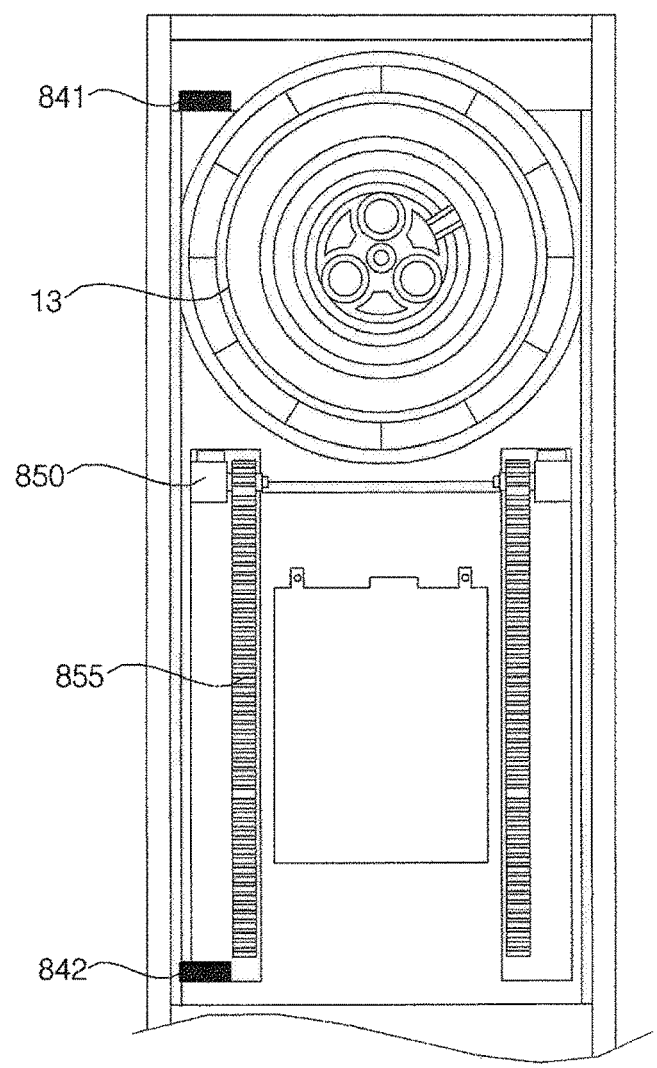
Figure 13:
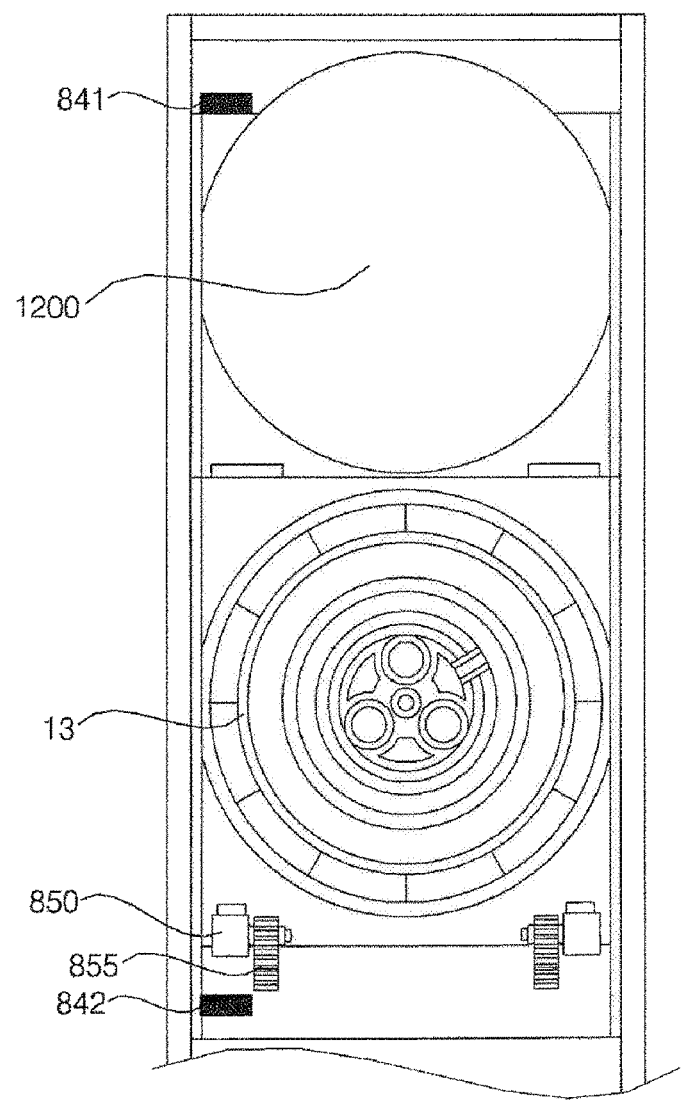

FIG. 12 is a view illustrating that the front panel 11 is viewed from an inner surface direction with the circulator door 13 closed, and FIG. 13 is a view illustrating that the front panel 11 is viewed in the inner surface direction with the circulator door 13 opened.

Referring to FIGS. 10 to 13, a top proximity sensor 1010 and/or the vision module 210 may detect proximity of the user.

According to an embodiment, the vision module 210 may be set to be lifted to operate only during the operation of the air-conditioner. In some cases, the vision module 210 may also be lowered and be accommodated in the main body 10 according to the product OFF command. In this case, it is more preferable for the top proximity sensor 1010 to perform human body detection for preventing an accident such as preventing hand pinching or the like.

Meanwhile, the top proximity sensor 1010 may be disposed on the display module 292. Since the top proximity sensor 1010 is disposed on the display module 292, it is possible to accurately and quickly detect a case where the user inputs a product OFF command and does not retreat.

In addition, since a circuit element for the top proximity sensor 1010 may be mounted on a board provided in the display module 292, a circuit and a connection line may be more simply configured.

Referring to FIGS. 10 to 13, the circulator door 13 may open and close an outlet 1200 so that air treated in the air-conditioner, such as heat-exchanged air, purified air, and the like is discharged to the outside.

The circulator door 13 may be opened when the main body operates, so that the circulator module 15 is exposed to the outside to discharge air through the outlet 1200 or so that the circulator module 15 moves forward through the outlet 1200. When the operation is terminated, the outlet may be closed. A space in which the circulator door 13 is accommodated when the outlet is opened may be provided on an inner side or rear side of the front panel 11.

Moving units 850 and 855 for moving the circulator door 13 may be installed on an inner side of the front panel 11. For example, the circulator door step motor 850, a gear member, a rail member 855, and the like for moving the circulator door 13 upward or downward according to rotation of the circulator door step motor 850 may be provided on the inner side of the front panel 11.

The circulator door 13 may be configured to move upward or downward so as to be opened on the inner side of the main body 10. Since the circulator door 13 is disposed at an upper portion of the front panel 11 of the main body 10, it may be more preferable for the circulator door 13 to move downward so as to be opened.

Alternatively, the circulator door 13 may be configured to move backward to an inner side of the main body 10 and subsequently move upward or downward so as to be opened. Also, in this case, it may be more preferable for the circulator door 13 to move backward to the inner side of the main body 10 and subsequently move downward so as to be opened, in terms of space usage.

When the circulator door 13 is opened, the circulator module 15 may move forward in the forward direction toward the front panel 11 to discharge air. At least a portion of the circulator module 15 may be exposed to the outside through the outlet 1200.

In addition, when the operation is terminated, the circulator module 15 may move backward in the inward direction of the main body 10 and the outlet may be closed by the movement of the circulator door 13.

The moving units 850 and 855 for moving the circulator door 13 may include, for example, the circulator door motor 840, a pinion receiving a rotational force from the circulator door motor 850, a shaft where a pair of pinions are disposed at opposing ends thereof, the guide rail 855, and the like.

A step motor may be used as the circulator door motor 850. In this case, the circulator door motor 850 may be a circulator door step motor 850.

A rotation angle of the circulator door step motor 850 may be determined by the number of input pulses. In case of a step motor that rotates one wheel for 360 input pulses, the step motor may rotate about 1 degree each time one pulse is input.

The step motor is advantageously inexpensive and easy to control an accurate angle (position).

A driving method of the step motor may be classified into unipolar driving and bipolar driving based on a direction of a current. In addition, the driving method of the step motor may be classified into constant voltage driving, voltage conversion driving, and constant current driving based on a control method of an excitation current.

The present disclosure is not limited to the driving method of the step motor. In addition, the moving units for moving the circulator door 13 may also be configured with a structure different from the example described above.

The circulator door step motor 850 may be disposed at both ends or one end of the shaft to provide a rotational force.

When the circulator door step motor 850 rotates, the circulator door 13 may move along the guide rail 855.

Meanwhile, when a product OFF command is input, the controller 240 may check sensing data of the top proximity sensor 1010 and/or the vision module 210. If the user is not detected within a reference distance, the controller 240 may control the circulator door 13 to move and be closed. Accordingly, it is possible to prevent an accident such as a hand pinching or the like during the closing operation of the circulator door 13.

Referring to FIGS. 10 to 13, the air-conditioner according to an embodiment of the present disclosure may include the top position sensor 841 and the bottom position sensor 842 disposed on the inner side of the front panel 11 and detecting movement of the circulator door 13.

For example, the top position sensor 841 and the bottom position sensor 842 may each have an infrared (IR) transmission/reception module at a movement start point (highest point) and a movement end point (lowest point) of the circulator door 13 to detect a position of the circulator door 13.

In the case of a normal operation, the circulator door 13 may be detected by one of the top position sensor 841 and the bottom position sensor 842.

For example, the circulator door 13 in a closed state may be detected by the top position sensor 841, and the circulator door 13 in an open state may be detected by the bottom position sensor 841.

According to the product ON/OFF command, the controller 240 may check an initial position of the circulator door 13 and move the circulator door 13 to the opposite position.

When the circulator door 13 moves from the initial position to the opposite position and a detection sensor at the opposite position starts detecting, the controller 240 may decelerate the circulator door step motor 850.

In addition, the controller 240 may control the circulator door 13 to stop when the circulator door 13 reaches a target point (highest point or lowest point).

Meanwhile, when the circulator door 13 is detected by the top position sensor 841 or the bottom position sensor 842 although the circulator door 13 is not at the correct initial position, the controller 240 may control movement of the circulator door 13 based on position information of the circulator door 13.

However, an abnormal operation condition in which the circulator door 13 is not detected by both the two sensors 841 and 842 may occur between the top position sensor 841 and the bottom position sensor 842.

For example, such an abnormal operation condition may occur in case of power cord off or power failure when the circulator door 13 is present in a middle position region between the top position sensor 841 and the bottom position sensor 842.

When the abnormal operation condition occurs, the controller 240 may perform control to perform a compensation operation.

The controller 240 may perform an initialization compensation operation with a closed operation so that the top position sensor 841 may detect the circulator door 13.

In this case, the controller 240 may control the circulator door step motor 850 to operate in a max step.

Thereafter, when the circulator door 13 is detected by the top position sensor 841, the controller 240 may control the circulator door 13 based on the detected position information.

Alternatively, if the circulator door 13 is not detected by the top position sensor 841, the controller 240 may unconditionally stop the circulator door 13 and respond in a sensor failure mode. In the sensor failure mode, the controller 240 may control the audio output unit 291 and/or the display module 292 to output a message indicating the sensor failure.

Figure 14:
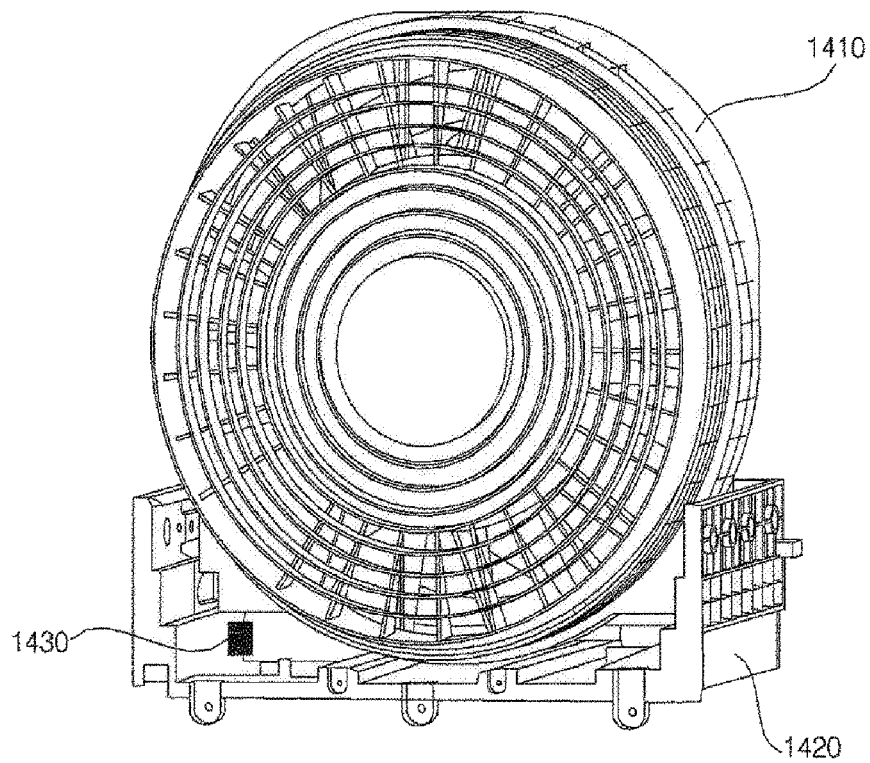
Figure 15:
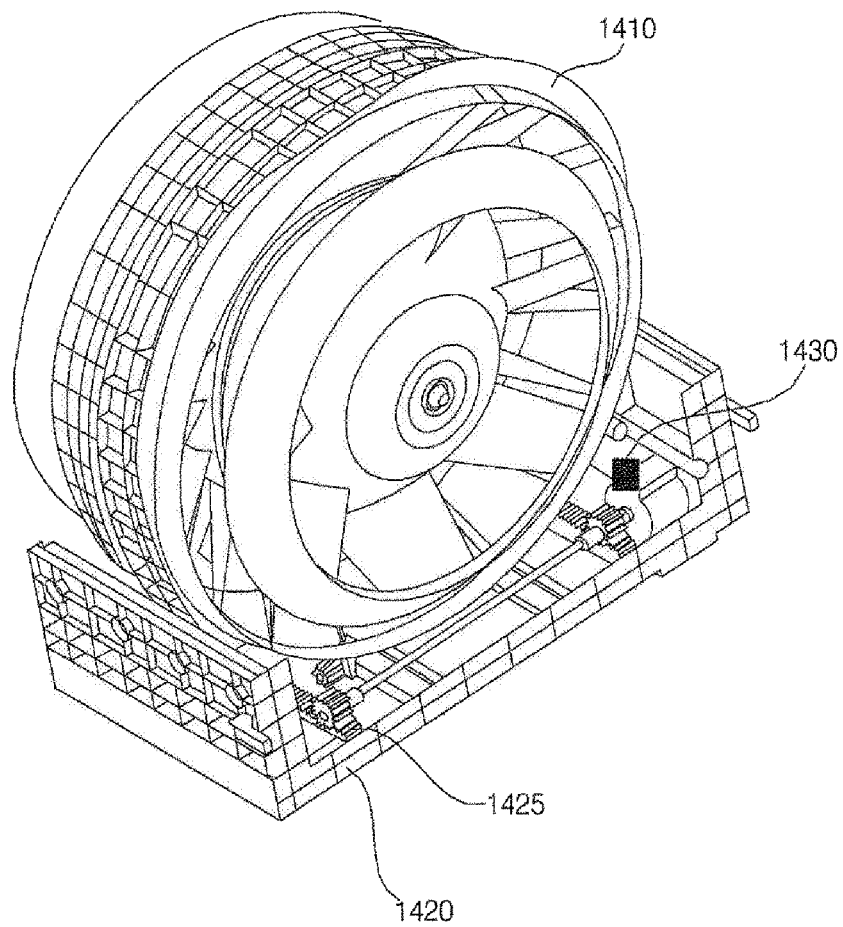
Figure 16:
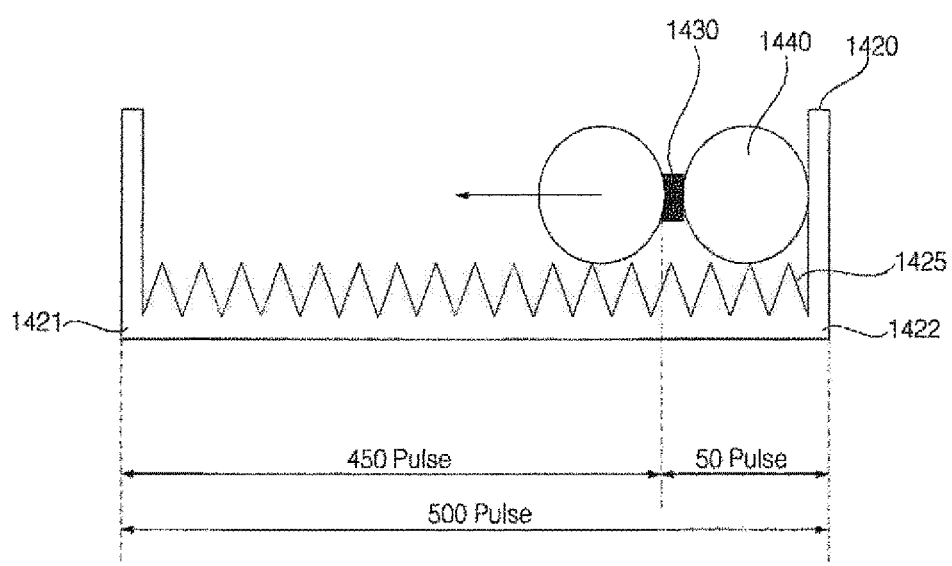

FIG. 14 is a diagram illustrating a front side of a circulator module according to an embodiment of the present disclosure, FIG. 15 is a diagram illustrating a rear side of a circulator module according to an embodiment of the present disclosure, and FIG. 16 is a conceptual diagram illustrating a movement range of a circulator module and an operating area of a circulator module step motor according to an embodiment of the present disclosure.

Referring to FIGS. 14 to 16, the circulator module according to an embodiment of the present disclosure may include a circulator fan 1410 and a circulator moving unit 1420 for moving the circulator fan 1410.

The circulator moving unit 1420 includes a circulator module step motor 1440, a pinion receiving a rotational force from the circulator module step motor 1440, a shaft in which a pair of pinions is disposed at opposing ends, a guide rail 1425, and the like.

A rotation angle of the circulator module step motor 1440 may be determined by the number of input pulses. In addition, the circulator fan 1410 or the entire circulator module may move in proportion to the rotational force of the circulator module step motor 1440.

Accordingly, an operating area and distance of the circulator module step motor 1440 may be represented by the number of input pulses.

The circulator fan 1410 may move back and forth between a rear end 1422 which is the rearmost point and a front end 1421 which is the foremost point. At the time of a product OFF operation, the circulator fan 1410 may move backward to the rear end 1422 and be accommodated in the main body.

At the time of a product ON operation, the circulator fan 1410 may move forward to the front end 1421 to discharge air.

In addition, the circulator module position detection sensor 1430 may be disposed between the rear end 1422 and the front end 1421 of a movement range of the circulator fan 1410. The circulator module position detection sensor 1430 may detect movement of the circulator fan 1410. According to an embodiment, the circulator module position detection sensor 1430 may detect the circulator module step motor 1440.

The circulator module position detection sensor 1430 may be disposed at a specific position within the movement range of the circulator fan 1410. Preferably, the circulator module position detection sensor 1430 may be disposed at a position spaced apart from the rear end 1422 by a first distance. That is, the circulator module position detection sensor 1430 may be disposed before the first distance from the rear end 1422 toward the front end 1421.

For example, the first distance may be set to correspond to 50 input pulses. Accordingly, if the circulator fan 1410 moves only a distance corresponding to 10 input pulses, the circulator fan 1410 may be detected by the circulator module position detection sensor 1430.

Therefore, an operation time may be reduced by minimizing the amount of movement of the circulator fan 1410 during the initialization process.

Meanwhile, when the product ON command is received, that is, when power is applied, the controller 240 may perform an initialization operation of the circulator door 13 and the circulator module 15 and subsequently perform an opening operation.

Meanwhile, order of the initialization operations of the circulator door 13 and the circulator module 15 may vary according to an embodiment. According to an embodiment, the initialization operations of the circulator door 13 and the circulator module 15 may be performed in parallel.

When the product ON command is received, the controller 240 may detect the position of the circulator door 13 through the top position sensor 841.

If there is no abnormality, the controller 240 may control the circulator door 13 to move in a downward direction, and detect movement of the circulator door 13 through the bottom position sensor 842.

Based on circulator door 13 sensing data from the bottom position sensor 842, the controller 240 may determine whether the circulator door 13 is properly opened.

Thereafter, the controller 240 may control the circulator module 15 or the circulator fan 1410 to move forward to the position corresponding to the first distance to the front end 1421 and then move backward to be returned.

According to the movement of the circulator module 15 or the circulator fan 1410, the circulator module position detection sensors 860 and 1430 may be turned on and then switched to OFF.

If there is no abnormality in the ON/OFF switching of the circulator module position detection sensors 860 and 1430, the controller 240 may apply input pulses for moving forward by the second distance greater than the first distance to the circulator module step motor 1440.

Here, the second distance may be equal to or greater than a distance corresponding to the entire movement range in the guide rail 1425.

In the example of FIG. 16, the total length of the guide rail 1425 may be set to correspond to 500 input pulses, and the second distance may be set to correspond to 450 input pulses enabling movement or 500 input pulses of the guide rail 1425.

When the circulator module step motor 1440 rotates, the circulator fan 1410 may move forward to the front end 1421.

Thereafter, the circulator module 15 may operate according to an operation mode.

When the product OFF command is received, the controller 240 may control the circulator fan 1410 to move backward to the rear end 1422. For example, the controller 240 may apply input pulses enabling moving backward by the second distance to the circulator module step motor 1440.

According to the backward movement of the circulator fan 1410, the circulator module position detection sensors 860 and 1430 may be turned on.

In this case, the controller 240 may apply input pulses for additional backward movement to the circulator module step motor 1440. For example, the controller 240 may apply 50 input pulses for additional backward movement to the circulator module step motor 1440.

Accordingly, the circulator module position detection sensors 860 and 1430 may be switched to OFF, and the controller 240 may check the initial position of the circulator door 13 through the bottom position sensor 842.

If there is no abnormality in the initial position of the circulator door 13, the controller 240 may control the circulator door 13 to move upward and be closed.

According to an embodiment of the present disclosure, an initialization operation such as detecting the positions of the circulator door 13 and the circulator module 15 may be performed.

The controller 240 may perform an initialization operation of applying 10 input pulses for forward movement to the circulator module step motor 1440.

In addition, the controller 240 may perform a compensation operation for applying 450 or 500 input pulses for backward movement to the circulator module step motor 1440.

In addition, if the operation of the circulator module position detection sensor 860 is not ascertained during the initialization operation, the controller 240 may detect and output a malfunction of the sensor 860 or the like.

Hereinafter, the initialization operation and the compensation operation will be described in detail with reference to the drawings.

Figure 17:
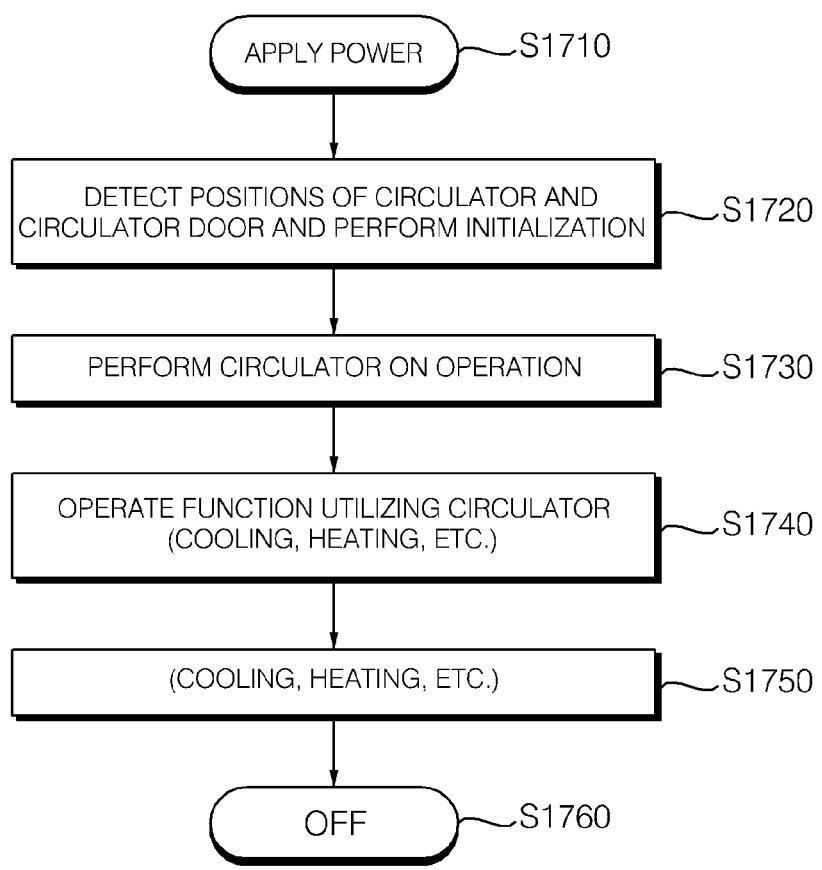
FIG. 17 is a flowchart illustrating a control method of an air-conditioner according to an embodiment of the present disclosure.

FIG. 17 is a flowchart illustrating a control method of an air-conditioner according to an embodiment of the present disclosure, specifically, illustrating a control method of an air-conditioner when a product is powered on.

Referring to FIG. 17, when power is applied to the air-conditioner according to an embodiment of the present disclosure (S1710), the controller 240 may perform control to perform an initialization operation of the circulator door 13 and the circulator module 15 (S1720).

When the initialization operation is completed, the controller 240 may control to perform an ON operation in which the circulator door 13 is opened and the circulator module 15 moves forward (S1730).

In addition, the controller 240 may control to perform an operation according to a predetermined operation mode such as air conditioning by utilizing the circulator module 15 (S1740).

Meanwhile, when a power-OFF command is received, the controller 240 may control to perform an OFF operation in which the circulator module 15 moves backward and the circulator door 13 is closed (S1750). Accordingly, the air-conditioner may be turned off without abnormality (S1760).

Figure 18:
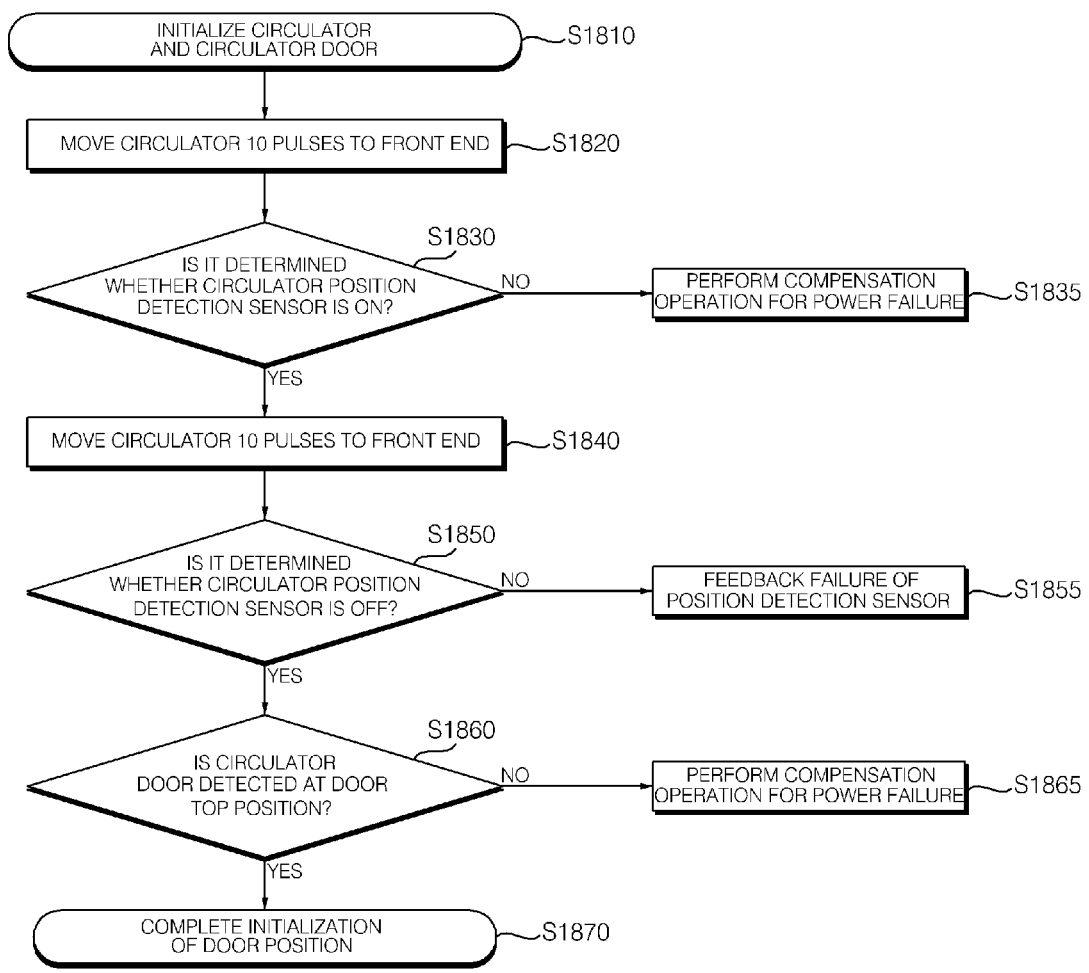
FIG. 18 is a flowchart illustrating a control method of an air-conditioner according to an embodiment of the present disclosure.

FIG. 18 is a flowchart illustrating a method of controlling an air-conditioner according to an embodiment of the present disclosure, specifically, illustrating an initialization process.

Referring to FIG. 18, an initialization operation may be started when power is applied to the air-conditioner (S1810).

The controller 240 may control the circulator module 15 to move 10 pulses toward the front end 1421 by applying the 10 input pulses for forward movement to the circulator module step motor 1440 (S1820).

If the circulator module 15 is not identified by the circulator module position detection sensors 860 and 1430 (S1830), the controller 240 may control to perform a compensation operation according to an emergency situation such as power failure. (S1835).

If the circulator module 15 is identified by the circulator module position detection sensors 860 and 1430 (S1830), the controller 240 may control the circulator module 15 to move 10 pulses toward the rear end 1422 by applying 10 input pulses for backward movement to the circulator module step motor 1440.

In this case, if detecting of the circulator module 15 by the circulator module position detection sensors 860 and 1430 is not terminated (S1850), the controller 240 may control to output information indicating failure of the circulator module position detection sensors 860 and 1430.

Normally, the circulator module position detection sensors 860 and 1430 are turned on when detecting the circulator module 15 (S1830) according to forward movement of the circulator module 15 initialization operation (S1820), and the circulator module position detection sensors 860 and 1430 are switched to an OFF state (S1850) according to backward movement of the circulator module 15 (S1840).

Therefore, if the circulator module 15 is not switched to the OFF state (S1850), the controller 240 may determine that the circulator module position detection sensors 860 and 1430 are broken down and output a message indicating the failure of the circulator module position detection sensors 860 and 1430 through the display module 292 and/or the audio output unit 291 (S1855).

Meanwhile, the controller 240 checks whether the circulator door 13 is detected by the top position sensor 841 (S1860), and when the circulator door 13 is at the initial position, the controller 240 may perform control to complete the initialization operation (S1870). That is, before the opening operation of the circulator door 13 starts according to the product ON command, the controller 240 may determine the initial position of the circulator door 13, and if there is no abnormality, opening operation may start.

When the initialization operation is completed (S1860), the controller 240 may control the circulator door 13 to be opened and the circulator module 15 to move forward.

Meanwhile, an abnormal situation that the circulator door 13 is not detected in the initialization process according to the product ON/OFF command may occur. Such an abnormal situation may occur due to power failure, initialization, or mechanism jamming.

In the initialization process, if the top position sensor 841 does not detect the circulator door 13, the controller 240 may control to perform a compensation operation of the circulator door 13 (S1865).

For example, the controller 240 may control the circulator door 13 to move upward.

The controller 240 may control the circulator door 13 to move upward, and determine whether the circulator door 13 is detected by the top position sensor 841.

In this case, the controller 240 may control the circulator door step motor 850 to rotate by a preset maximum setting value.

Meanwhile, when the circulator door 13 is detected by the top position sensor 841 according to the upward movement of the circulator door 13, the controller 240 may control to reduce a rotation speed of the circulator door step motor 850, thereby reducing overswing and noise that may occur during an abnormal situation handling process.

Also, in this case, when the top position sensor 841 detects that the circulator door 13 has reached a preset highest point, the controller 240 may control the circulator door step motor 850 to stop.

Meanwhile, if the circulator door 13 is not detected by the top position sensor 841 even with the upward movement of the circulator door 13, the controller 240 may control the circulator door step motor 850 to stop.

In other words, if it fails to detect the circulator door 13 although the circulator door 13 has moved upward to the maximum level to detect the circulator door 13 again, the circulator door 13 may not be moved any further.

This situation may be determined as sensor failure. In this case, the audio output unit 291 may output information indicating the failure of the position sensor unit 840 as sound. In addition, the display module 292 may display information indicating the failure of the position sensor unit 840.

Accordingly, it is possible to flexibly handle variables such as power failure, initialization, and mechanism jamming and improve noise of the mechanism overswing.

Figure 19:
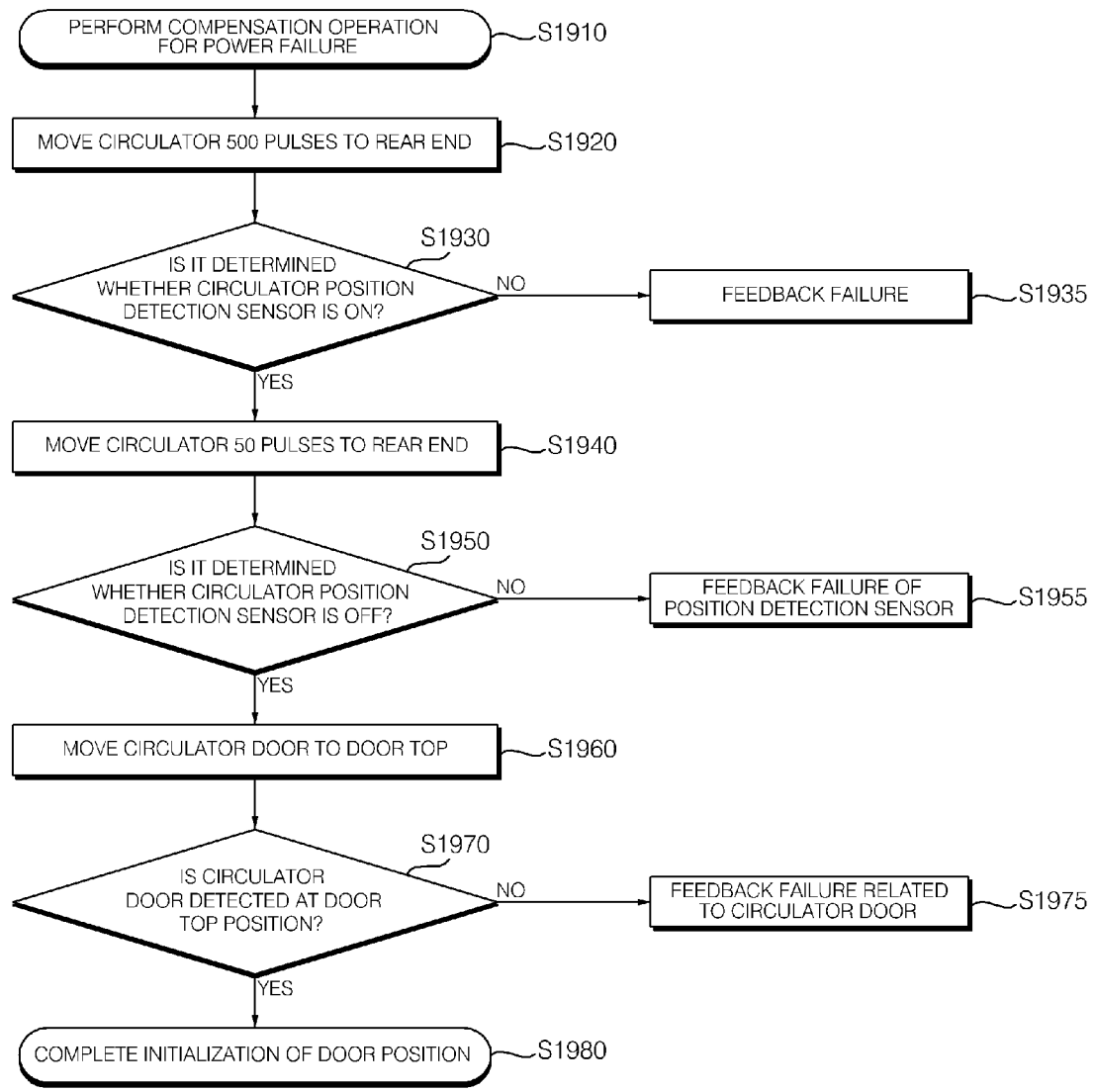
FIG. 19 is a flowchart illustrating a control method of an air-conditioner according to an embodiment of the present disclosure.

FIG. 19 is a flowchart illustrating a control method of an air-conditioner according to an embodiment of the present disclosure, specifically, illustrating a compensation operation process of a circulator module.

As described above with reference to FIG. 18, if the circulator module 15 is not identified by the circulator module position detection sensors 860 and 1430 (S1830), the controller 240 may control to perform a compensation operation according to an emergency situation such as power failure or the like (S1835).

Referring to FIG. 19, as the compensation operation of the circulator module 15 starts (S1910), the controller 240 may control the circulator module 15 to move 500 pulses toward the rear end 1422 by applying 500 input pulses to the circulator module step motor 1440 (S1920).

The controller 240 may move the circulator module 15 backward as much as possible (S1920) and determine whether the circulator module 15 is detected by the circulator module position detection sensors 860 and 1430 (S1930).

If the circulator module 15 is not identified by the circulator module position detection sensors 860 and 1430 (S1930), the controller 240 may control to feedback failure information (S1935).

If the circulator module 15 has moved, the controller 240 may control the display module 292 and/or the audio output unit 291 to output a message indicating failure of the circulator module position detection sensors 860 and 1430.

In addition, if the circulator module 15 has not moved, the controller 240 may control the display module 292 and/or the audio output unit 291 to output a message indicating failure of the circulator module step motor 1440.

Meanwhile, after the backward movement of the circulator module 15 compensation operation (S1920), the controller 240 may control the circulator module 15 to move backward further (S1930).

For example, the controller 240 may control the circulator module 15 to move 50 pulses toward the rear end 1422 by applying 50 input pulses for backward movement to the circulator module step motor 1440 (S1930).

The circulator module 15 may be controlled to pass the circulator module position detection sensors 860 and 1430 by slightly moving the circulator module 15 backward.

If the circulator module position detection sensors 860 and 1430 are not switched to the OFF state even after the circulator module 15 passes the circulator module position detection sensors 860 and 1430, the controller 240 may control to output information indicating failure of the circulator module position detection sensors 860 and 1430.

Meanwhile, when the circulator door 13 is detected by the top position sensor 841 (S1970), the controller 240 may control to complete the initialization operation (S1980).

However, if the circulator door 13 is not detected by the top position sensor 841 (S1970), the controller 240 may control the display module 292 and/or the audio output unit 291 to feedback failure information related to the circulator door 13 (S1980).

According to an embodiment, also, in this case, if the circulator door 13 is not detected by the top position sensor 841 (S1970), the controller 240 may control to perform a compensation operation of the circulator door 13 (S1865).

According to at least one of the embodiments of the present disclosure, the air-conditioner and the control method for preventing collision, failure, and noise between structures that may occur during an opening and closing operation may be provided.

In addition, according to at least one of the embodiments of the present disclosure, the circulator module and the circulator door may be efficiently controlled by using sensing data sensed by sensors when the product is turned on/off.

In addition, according to at least one of the embodiments of the present disclosure, an abnormal situation may be effectively handled.

In addition, according to at least one of the embodiments of the present disclosure, air flow may be controlled variously and efficiently.

In addition, according to at least one of the embodiments of the present disclosure, various functions such as a voice recognition function and a humidification function may be provided.

In addition, according to at least one of the embodiments of the present disclosure, the modules may be cleanly and safely accommodated and managed when not in operation.

In addition, according to at least one of the embodiments of the present disclosure, since the air-conditioner operates according to sensed user's position information, user convenience may be improved.

With the air-conditioner described above, the configuration and method of the embodiments described above are not limited in its application, but all or some of the embodiments may be selectively combined to be configured to make various modifications.

In the embodiments of the present disclosure, the control method of the air-conditioner according to the present disclosure may be implemented as codes that can be read by a processor provided in a network device in a recording medium. The processor-readable recording medium may include any type of recording devices in which data that can be read by the processor is stored. The processor-readable recording medium may include a ROM, a RAM, a CD-ROM, a magnetic tape, a floppy disk, an optical data storage device, and the like. The processor-readable medium also includes implementations in the form of carrier waves or signals, e.g., transmission via the Internet. The processor-readable recording medium may be distributed over network-coupled computer systems so that the processor-readable code may be stored and executed in a distributed fashion.

Specific embodiments have been described. However, the present disclosure is not limited to the specific embodiments and various modifications may be made without departing from the scope of the present disclosure claimed in the claims, and such modifications should not be individually understood from technical concepts or prospects of the present disclosure.

The invention claimed is:

1. An air-conditioner comprising:
 a front panel forming an appearance of a front portion;
 a circulator door disposed at the front panel and moving in an up-down direction so as to open and close an opening of the front panel;
 a circulator module moving backward based on an OFF command and moving forward based on an ON command and configured to discharge air through the opening;
 a circulator module position detection sensor disposed between a rearmost point and a foremost point of a movement range of the circulator module; and
 a controller controlling the circulator door to move in a downward direction so as to open the opening and the circulator module to move forward based on the ON command,
 wherein the controller is configured to perform an initialization operation to initialize position of the circulator module by moving the circulator module forward until the circulator module is detected by the circulator module position detection sensor, and then, moving the circulator module backward by a first distance before the circulator door moves in the downward direction.

2. The air-conditioner of claim 1, wherein in the initialization operation, the controller controls the circulator door to initialize position thereof before the circulator door moves in the downward direction.

3. The air-conditioner of claim 2, further comprising:
 a position sensor unit disposed on an inner surface of the front panel and including an top position sensor and a bottom position sensor detecting movement of the circulator door.

4. The air-conditioner of claim 1, wherein after the backward movement of the circulator module in the initialization operation, the controller performs control to complete the initialization operation, if the circulator module is not detected by the circulator module position detection sensor and the circulator door is detected by the top position sensor.

5. The air-conditioner of claim 1, wherein the controller controls the circulator door to move in an upward direction, if the circulator door is not detected by the top position sensor.

6. The air-conditioner of claim 5, wherein the controller performs control to reduce a revolution per minute (RPM) of a circulator door motor when the circulator door is detected by the top position sensor according to the upward movement of the circulator door, and
 the controller controls the circulator door motor to be stopped when the top position sensor detects that the circulator door reaches a preset highest point.

7. The air-conditioner of claim 6, wherein the controller performs control to output information indicating failure of the position sensor unit, if the circulator door is not detected by the top position sensor in spite of the upward movement of the circulator door.

8. The air-conditioner of claim 1, wherein, after the circulator module is detected by the circulator module position detection sensor according to the forward movement of the circulator module in the initialization operation, the controller performs control to output information indicating failure of the circulator module position detection sensor if detecting of the circulator module is not terminated.

9. The air-conditioner of claim 1, wherein, after the forward movement of the circulator module in the initialization operation, if the circulator module is not detected by the circulator module position detection sensor, the controller controls the circulator module to perform a compensation operation.

10. The air-conditioner of claim 9, wherein, in the compensation operation of the circulator module, the controller performs control to complete the initialization operation if the circulator module moves backward by a second distance greater than the first distance, the circulator module is detected by the circulator module position detection sensor, and the circulator door is detected by the top position sensor.

11. The air-conditioner of claim 10, wherein after the backward movement of the circulator module in the compensation operation, if the circulator module additionally moves backward by a third distance greater than the first distance and smaller than the second distance, the circulator module is detected by the circulator module position detection sensor, and the circulator door is detected by the top position sensor, the controller performs control to complete the initialization operation.

12. The air-conditioner of claim 11, wherein, if detecting of the circulator module is not terminated after the circulator module is detected by the circulator module position detection sensor according to the additional backward movement of the circulator module in the compensation operation, the controller performs control to output information indicating failure of the circulator module position detection sensor.

13. The air-conditioner of claim 10, wherein after the backward movement of the circulator module in the compensation operation, if the circulator module is not detected by the circulator module position detection sensor, the controller performs control to feedback failure information.

14. The air-conditioner of claim 10, wherein if the circulator door is not detected by the top position sensor, the controller performs control to feedback failure information related to the circulator door.

15. The air-conditioner of claim 1, wherein the controller controls the circulator module to move backward and the circulator door to move in an upward direction so as to be closed based on the OFF command.

16. The air-conditioner of claim 1, wherein the controller comprises a first controller controlling movement of the circulator door and a second controller controlling movement of the circulator module.

17. An air-conditioner comprising:
a front panel forming an appearance of a front portion;
a circulator door disposed at the front panel and configured to open and close an opening of the front panel;
a circulator module moving backward based on an OFF command and moving forward based on an ON command, and configured to discharge air through the opening;
a circulator module position detection sensor disposed between a rearmost point and a foremost point of a movement range of the circulator module; and
a controller controlling the circulator door to open the opening and the circulator module to move forward based on the ON command,
wherein the controller is configured to perform an initialization operation to initialize position of the circulator module by moving the circulator module forward until the circulator module is detected by the circulator module position detection sensor, and then, moving the circulator module backward by a first distance before the circulator door moves in the downward direction.

\* \* \* \* \*